US012625639B2

(12) United States Patent
Lee et al.

(10) Patent No.: US 12,625,639 B2
(45) Date of Patent: May 12, 2026

(54) STORAGE DEVICE AND OPERATING METHOD OF STORAGE DEVICE

(71) Applicant: SAMSUNG ELECTRONICS CO., LTD., Suwon-si (KR)

(72) Inventors: Youngmin Lee, Suwon-si (KR); Seongheum Baik, Suwon-si (KR); Myungsub Shin, Suwon-si (KR); Seongyong Jang, Suwon-si (KR); Gyuseok Choe, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 66 days.

(21) Appl. No.: 18/380,945

(22) Filed: Oct. 17, 2023

(65) Prior Publication Data

US 2024/0370196 A1 Nov. 7, 2024

(30) Foreign Application Priority Data

May 2, 2023 (KR) ........................ 10-2023-0057247

(51) Int. Cl.
*G06F 3/06* (2006.01)

(52) U.S. Cl.
CPC .......... *G06F 3/0652* (2013.01); *G06F 3/0607* (2013.01); *G06F 3/064* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 8,131,915 B1* | 3/2012 | Yang | G06F 12/0246 |
| | | | 711/163 |
| 9,208,071 B2 | 12/2015 | Talagala et al. | |
| 10,331,555 B1* | 6/2019 | Muthiah | G06F 3/0656 |
| 10,372,335 B2 | 8/2019 | Stabrawa et al. | |
| 10,489,289 B1* | 11/2019 | Peterson | G06F 3/0652 |
| 10,657,041 B2* | 5/2020 | Doh | G06F 12/0246 |
| 10,726,865 B2 | 7/2020 | Gerhart et al. | |
| 11,237,769 B2 | 2/2022 | Kanno | |
| 2011/0149651 A1* | 6/2011 | Gorobets | G11C 16/0483 |
| | | | 365/185.11 |
| 2013/0151754 A1* | 6/2013 | Post | G06F 12/0246 |
| | | | 711/E12.008 |
| 2013/0275660 A1* | 10/2013 | Bennett | G06F 12/0246 |
| | | | 711/103 |

(Continued)

*Primary Examiner* — Jared I Rutz
*Assistant Examiner* — Elias Young Kim
(74) *Attorney, Agent, or Firm* — Sughrue Mion, PLLC

(57) ABSTRACT

Disclosed is a storage device which includes a nonvolatile memory device that includes a plurality of erase units each including a plurality of memory cells, and a memory controller. Based on an open zone request received from an external host device, the memory controller allocates a zone to at least one erase unit among the plurality of erase units and permits only a sequential write with respect to the zone. The memory controller generates a map table mapping sequential logical addresses of data written in the zone to sequential physical addresses. Based on a partial invalidation request received from the external host device, the memory controller manages data corresponding to the partial invalidation request from among the data written in the zone as invalid data while maintaining the map table.

20 Claims, 20 Drawing Sheets

(56) References Cited

U.S. PATENT DOCUMENTS

| | | | | |
|---|---|---|---|---|
| 2016/0070474 A1* | 3/2016 | Yu | | G06F 12/0246 |
| | | | | 711/103 |
| 2016/0266792 A1 | 9/2016 | Amaki et al. | | |
| 2017/0060768 A1* | 3/2017 | Zhang | | G06F 3/0652 |
| 2017/0185322 A1* | 6/2017 | Stephens | | G06F 12/128 |
| 2018/0032541 A1* | 2/2018 | Park | | G06F 16/122 |
| 2019/0034364 A1* | 1/2019 | Lee | | G06F 13/1673 |
| 2019/0171559 A1* | 6/2019 | Lee | | G06F 12/0246 |
| 2020/0026436 A1* | 1/2020 | Ou | | G06F 3/0611 |
| 2020/0089407 A1 | 3/2020 | Baca et al. | | |
| 2021/0132827 A1 | 5/2021 | Helmick et al. | | |
| 2021/0182166 A1 | 6/2021 | Hahn et al. | | |
| 2021/0405914 A1* | 12/2021 | Lam | | G06F 3/0679 |
| 2022/0137817 A1* | 5/2022 | Kwak | | G06F 3/0604 |
| | | | | 711/154 |
| 2022/0138096 A1 | 5/2022 | Kang | | |
| 2022/0317878 A1 | 10/2022 | Lin | | |
| 2023/0229589 A1* | 7/2023 | Ponnuswamy | | G06F 12/0253 |
| 2024/0004574 A1* | 1/2024 | Hamo | | G06F 3/0604 |
| 2024/0094903 A1* | 3/2024 | Kavirayani | | G06F 3/0631 |
| 2024/0232067 A1* | 7/2024 | Wu | | G06F 3/061 |

* cited by examiner

FIG. 9

STORAGE DEVICE AND OPERATING METHOD OF STORAGE DEVICE

CROSS-REFERENCE TO RELATED APPLICATIONS

This application claims priority under 35 U.S.C. § 119 to Korean Patent Application No. 10-2023-0057247 filed on May 2, 2023, in the Korean Intellectual Property Office, the disclosures of which are incorporated by reference herein in their entireties.

BACKGROUND

Embodiments of the present disclosure described herein relate to an electronic device, and more particularly, relate to a storage device reducing a write amplification factor (WAF) and improving security and an operating method of the electronic device.

A storage device refers to a device, which stores data under control of a host device, such as a computer, a smartphone, or a smart pad. The storage device includes a device, which stores data on a magnetic disk, such as a hard disk drive (HDD), or a device, which stores data in a semiconductor memory, in particular, a nonvolatile memory, such as a solid state drive (SSD) or a memory card.

The nonvolatile memory includes a read only memory (ROM), a programmable ROM (PROM), an electrically programmable ROM (EPROM), an electrically erasable and programmable ROM (EEPROM), a flash memory, a phase-change random access memory (PRAM), a magnetic RAM (MRAM), a resistive RAM (RRAM), or a ferroelectric RAM (FRAM).

The lifetime and reliability of the nonvolatile memory may be reduced whenever a write operation is performed in the nonvolatile memory. In particular, the flash memory has an erase-before-write characteristic that an erase operation should be performed between the write operations. Because the write operation of the flash memory causes the erase operation following the write operation, the repetitive write operations of the flash memory may reduce the lifetime and reliability of the flash memory.

SUMMARY

Embodiments of the present disclosure provide a storage device capable of reducing a write amplification factor (WAF) and providing improved security to important data and an operating method of the storage device.

Provided herein is a storage device including: a nonvolatile memory device including a plurality of erase units each including a plurality of memory cells; and a memory controller, wherein, based on an open zone request received from an external host device, the memory controller is configured to allocate a zone to at least one erase unit among the plurality of erase units and to permit only a sequential write with respect to the zone, wherein the memory controller is further configured to generate a map table, and the map table maps sequential logical addresses of first data written in the zone to sequential physical addresses, and wherein, based on a partial invalidation request received from the external host device, the memory controller is further configured to manage second data corresponding to the partial invalidation request from among the first data written in the zone as invalid data while maintaining the map table.

Also provided herein is a storage device including: a nonvolatile memory device including a plurality of erase units each including a plurality of memory cells; and a memory controller, wherein, based on an open zone request received from an external host device, the memory controller is configured to allocate a zone to at least one erase unit among the plurality of erase units and to permit only a sequential write with respect to the zone, wherein the memory controller is further configured to generate a map table, and the map maps sequential logical addresses of first data written in the zone to sequential physical addresses, and wherein, based on a partial invalidation request received from the external host device, the memory controller is further configured to perform an overwrite operation with respect to second data corresponding to the partial invalidation request from among the first data written in the zone while maintaining the map table.

Also provided herein is an operating method of a storage device including a nonvolatile memory device and a memory controller, the operating method including: setting a partial invalidation request to one of a first mode, a second mode, and a third mode depending on a request of an external host device; in the first mode, managing, at the memory controller, second data corresponding to the partial invalidation request as being invalid based on the partial invalidation request received from the external host device; in the second mode, based on the partial invalidation request received from the external host device, causing, by the memory controller, the nonvolatile memory device to perform an overwrite operation with respect to the second data corresponding to the partial invalidation request and managing the second data corresponding to the partial invalidation request as being invalid; and in the third mode, based on the partial invalidation request received from the external host device: copying, by the memory controller to another memory block, valid first data except for the second data corresponding to the partial invalidation request, the second data being among third data of a memory block corresponding to the partial invalidation request, and erasing the memory block corresponding to the partial invalidation request.

BRIEF DESCRIPTION OF THE FIGURES

The above and other objects and features of the present disclosure will become apparent by describing in detail embodiments thereof with reference to the accompanying drawings.

FIG. 9 is a diagram illustrating an example in which an electronic device performs partial invalidation with respect to data of a first zone.

DETAILED DESCRIPTION

Below, embodiments of the present disclosure will be described in detail with reference to the attached drawings to such an extent that the embodiments of the present disclosure are easily implemented by one skilled in the art.

Figure 1:
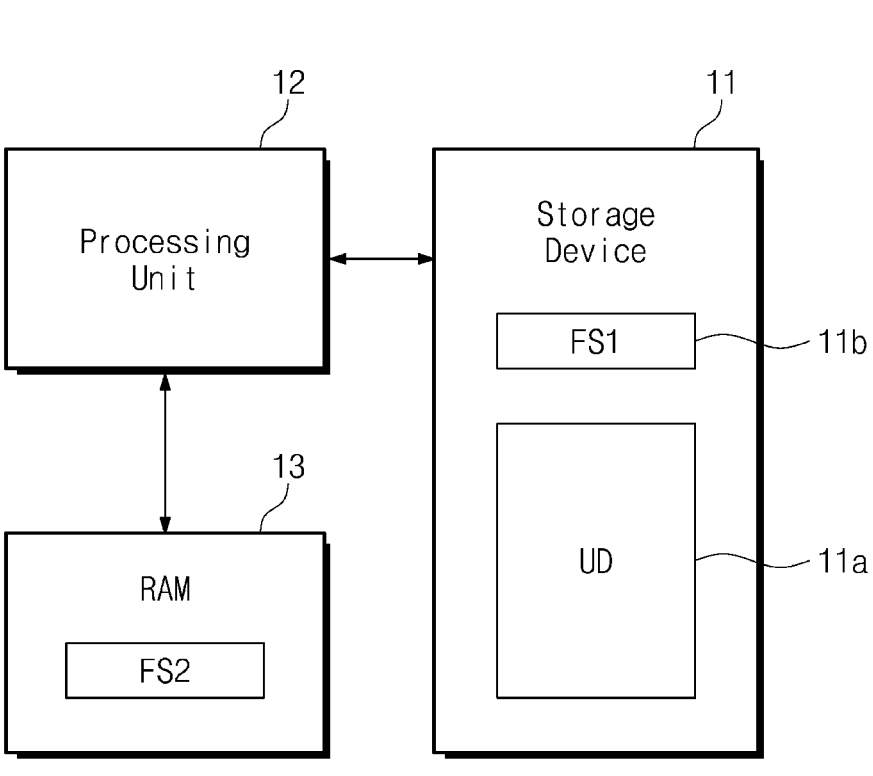
FIG. 1 illustrates an electronic device according to an embodiment of the present disclosure.

FIG. 1 illustrates an electronic device 10 according to an embodiment of the present disclosure. Referring to FIG. 1, the electronic device 10 may include a storage device 11, a processing unit 12, and a random access memory (RAM) 13.

The storage device 11 may include a nonvolatile memory device that retains data even when a power is turned off. The storage device 11 may include a first storage region 11*a* and a second storage region 11*b*.

The first storage region 11*a* may store user data UD that the processing unit 12 requests the storage device 11 to write. For example, the user data UD may include original data of an operating system or applications executable by the processing unit 12 and data generated by the operating system or the applications.

The second storage region 11*b* may be used to store a first file system FS1. The first file system FS1 may include configuration information of the first storage region 11*a* of the storage device 11. For example, the first file system FS1 may include various configuration information of the first storage region 11*a*, such as access unit information, partition information, file name information, file size information, and file address information.

The processing unit 12 may include a central processing unit (CPU) or an application processor (AP). The processing unit 12 may execute the operating system to drive the electronic device 10. The processing unit 12 may execute various applications. The random access memory 13 may be used for various purposes such as a system memory of the electronic device 10, a working memory of the processing unit 12, a buffer memory of the processing unit 12, and a cache memory of the processing unit 12.

The processing unit 12 may read the first file system FS1 stored in the second storage region 11*b* of the storage device 11 so as to be loaded to the random access memory 13 as a second file system FS2. The processing unit 12 may access the storage device 11 by using the second file system FS2 and may update the second file system FS2 if necessary. The updated portion of the second file system FS2 may be applied to the first file system FS1 of the storage device 11 through backup (or journaling).

Figure 2:
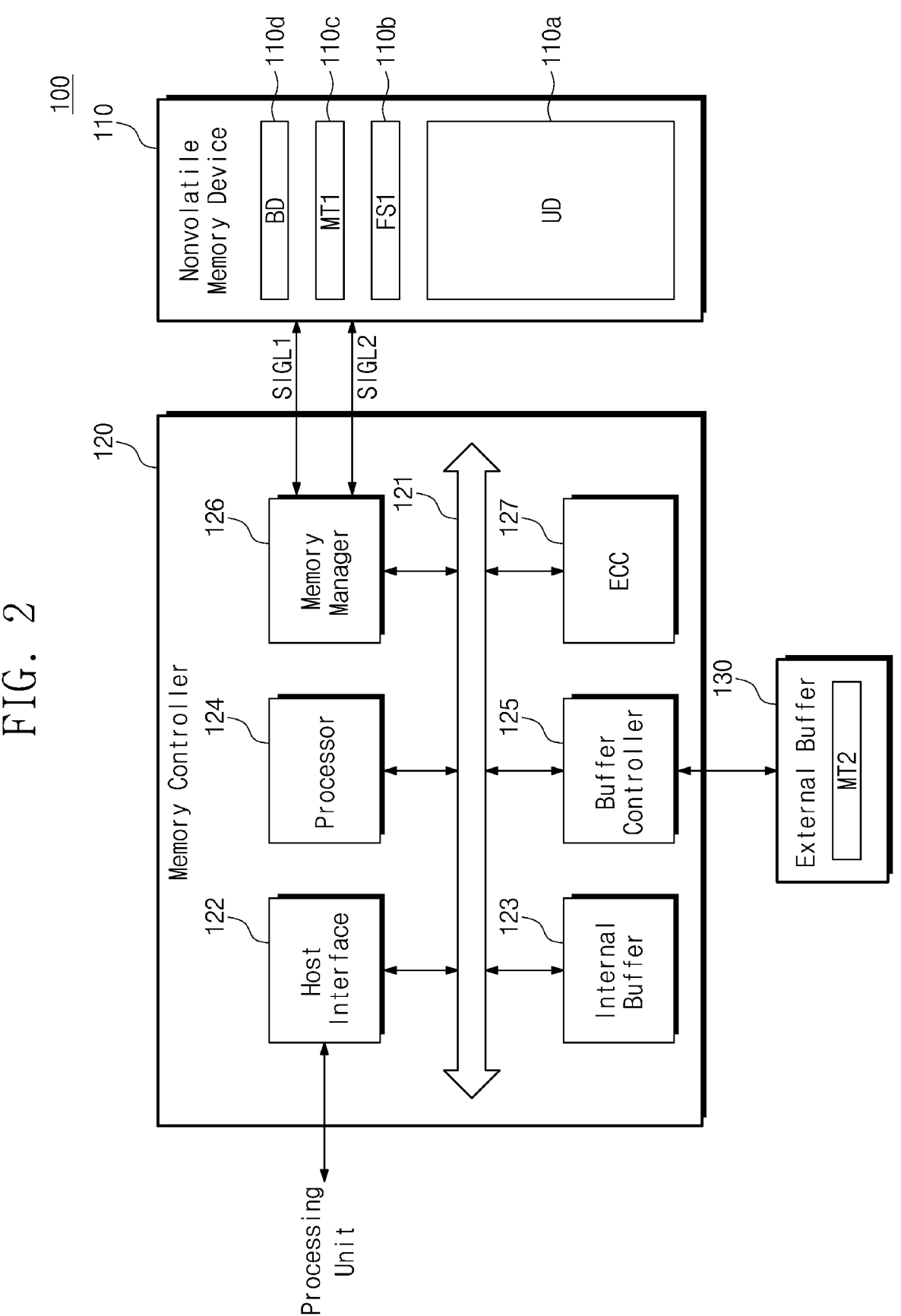
FIG. 2 illustrates a storage device according to an embodiment of the present disclosure.

FIG. 2 illustrates a storage device 100 according to an embodiment of the present disclosure. Referring to FIG. 2, the storage device 100 may correspond to the storage device 11 of FIG. 1. The storage device 100 may include a nonvolatile memory device 110, a memory controller 120, and an external buffer 130. The nonvolatile memory device 110 may include a plurality of memory cells. Each of the plurality of memory cells may store two or more bits.

For example, the nonvolatile memory device 110 may include at least one of various nonvolatile memory devices such as a flash memory device, a phase-change memory device, a ferroelectric memory device, a magnetic memory device, and a resistive memory device.

The memory controller 120 may receive various requests for writing data in the nonvolatile memory device 110 or reading data from the nonvolatile memory device 110, from the processing unit 12 (e.g., an external host device). The memory controller 120 may store (or buffer) user data communicated with the processing unit 12 in the external buffer 130 and may store meta data for managing the storage device 11 or 100 in the external buffer 130.

The memory controller 120 may access the nonvolatile memory device 110 through first signal lines SIGL1 and second signal lines SIGL2. For example, the memory controller 120 may transmit a command and an address to the nonvolatile memory device 110 through the first signal lines SIGL1. The memory controller 120 may exchange data with the nonvolatile memory device 110 through the first signal lines SIGL1.

The memory controller 120 may transmit a first control signal to the nonvolatile memory device 110 through the second signal lines SIGL2. The memory controller 120 may receive a second control signal from the nonvolatile memory device 110 through the second signal lines SIGL2.

In an embodiment, the memory controller 120 may be configured to control two or more nonvolatile memory devices. The memory controller 120 may provide first signal lines and second signal lines for each of the two or more nonvolatile memory devices.

As another example, the memory controller 120 may share the first signal lines with respect to the two or more nonvolatile memory devices. The memory controller 120 may share some of the second signal lines with respect to the two or more nonvolatile memory devices and may separately provide the others thereof.

The external buffer 130 may include a random access memory. For example, the external buffer 130 may include at least one of a dynamic random access memory, a phase-change random access memory, a ferroelectric random access memory, a magnetic random access memory, and a resistive random access memory.

The nonvolatile memory device 110 may include a first storage region 110*a*, a second storage region 110*b*, a third storage region 110*c*, and a fourth storage region 110*d*. Each of the first storage region 110*a*, the second storage region 110*b*, the third storage region 110*c*, and the fourth storage region 110*d* may include a plurality of memory cells.

The first storage region 110*a* may be used to store the user data UD and may correspond to the first storage region 11*a* of FIG. 1. The second storage region 110*b* may be used to store the first file system FS1 and may correspond to the second storage region 11*b* of FIG. 1.

The third storage region 110*c* may be used to store a first map table MT1. The first map table MT1 may be used for the storage device 11 or 100 to translate physical addresses into logical addresses. For example, requests, for example, write requests and read requests that the processing unit 12 transfers to the storage device 11 or 100 may be based on logical addresses. The user data UD may be written in the first storage region 110*a* based on physical addresses. The storage device 11 or 100 may translate logical addresses transferred from the processing unit 12 into physical addresses by using the first map table MTT and may access the first storage region 110*a*, in which the user data UD are stored, by using the physical addresses. In an embodiment, the capacity of the third storage region 110*c* may not be identified (or recognized) by the processing unit 12 as the storage capacity of the storage device 11 or 100.

The fourth storage region 110*d* may be used to store buffering data BD. For example, part or all of data to be written in the first storage region 110*a* may be first written in the fourth storage region 110*d* and may be migrated to the first storage region 110*a* (e.g., at an idle time). The migration may include writing original data (e.g., data of the fourth storage region 110*d*) in a target region (or a destination region) (e.g., the first storage region 110*a*) and then invalidating the original data (e.g., the data of the fourth storage region 110*d*). In an embodiment, when the capacity of the fourth storage region 110*d* is insufficient, the data to be written in the first storage region 110*a* may be directly written in the first storage region 110*a* without passing through the fourth storage region 110*d*. In an embodiment, the capacity of the fourth storage region 110*d* may be identified (or recognized) or may not be identified by the processing unit 12 as the storage capacity of the storage device 11 or 100.

The memory controller 120 may include a bus 121, a host interface 122, an internal buffer 123, a processor 124, a buffer controller 125, a memory manager 126, and an error correction code (ECC) block 127.

The bus 121 may provide communication channels between the components of the memory controller 120. The host interface 122 may receive various requests from the external host device and may parse the received requests. The host interface 122 may store the parsed requests in the internal buffer 123.

The host interface 122 may transfer various responses to the external host device. The host interface 122 may exchange signals with the external host device in compliance with a given communication protocol. The internal buffer 123 may include a random access memory. For example, the internal buffer 123 may include a static random access memory or a dynamic random access memory.

The processor 124 may execute an operating system or firmware for driving the memory controller 120. The processor 124 may read the parsed requests stored in the internal buffer 123 and may generate addresses and commands for controlling the nonvolatile memory device 110. The processor 124 may provide the generated commands and addresses to the memory manager 126.

The processor 124 may store various meta data for managing the storage device 100 in the internal buffer 123. The processor 124 may access the external buffer 130 through the buffer controller 125. The processor 124 may control the buffer controller 125 and the memory manager 126 such that the user data stored in the external buffer 130 are transmitted to the nonvolatile memory device 110.

The processor 124 may control the host interface 122 and the buffer controller 125 such that the data stored in the external buffer 130 are transmitted to the external host device. The processor 124 may control the buffer controller 125 and the memory manager 126 such that the data received from the nonvolatile memory device 110 are stored in the external buffer 130. The processor 124 may control the host interface 122 and the buffer controller 125 such that the data received from the external host device are stored in the external buffer 130.

The processor 124 may read the first map table MT1 stored in the third storage region 110*c* of the nonvolatile memory device 110 so as to be stored in the external buffer 130 as a second map table MT2. The processor 124 may translate logical addresses into physical addresses by using the second map table MT2 stored in the external buffer 130. If necessary, the processor 124 may update the second map table MT2 of the external buffer 130. The processor 124 may apply the updated portion of the second map table MT2 to the first map table MT1 of the nonvolatile memory device 110 through backup.

Under control of the processor 124, the buffer controller 125 may write data in the external buffer 130 or may read data from the external buffer 130. The memory manager 126 may communicate with the nonvolatile memory device 110 through the first signal lines SIGL1 and the second signal lines SIGL2 under control of the processor 124.

The memory manager 126 may access the nonvolatile memory device 110 under control of the processor 124. For example, the memory manager 126 may access the nonvolatile memory device 110 through the first signal lines SIGL1 and the second signal lines SIGL2. The memory manager 126 may communicate with the nonvolatile memory device 110, based on a protocol that is defined in compliance with the standard or is defined by a manufacturer.

The error correction code block 127 may perform error correction encoding on data to be provided to the nonvolatile memory device 110 by using the error correction code ECC. The error correction code block 127 may perform error correction decoding on data received from the nonvolatile memory device 110 by using the error correction code ECC.

In an embodiment, the external buffer 130 and the buffer controller 125 may be omitted in the storage device 100. When the external buffer 130 and the buffer controller 125 are omitted, the functions that are described as being performed by the external buffer 130 and the buffer controller 125 may be performed by the internal buffer 123.

For example, when the external buffer 130 and the buffer controller 125 are omitted, the processor 124 may read a portion (e.g., partial map data) of the first map table MT1 stored in the third storage region 110*c* of the nonvolatile memory device 110, so as to be stored in the internal buffer 123. When necessary map data are absent from the internal buffer 123, the processor 124 may read a necessary portion (e.g., necessary map data) of the first map table MT1 stored in the third storage region 110*c* of the nonvolatile memory device 110, so as to be stored in the internal buffer 123. When the storage capacity of the internal buffer 123 is insufficient, the processor 124 may secure the storage capacity of the internal buffer 123, which is used to load the necessary map data, by discarding part or all of the map data previously loaded to the internal buffer 123.

Figure 3:
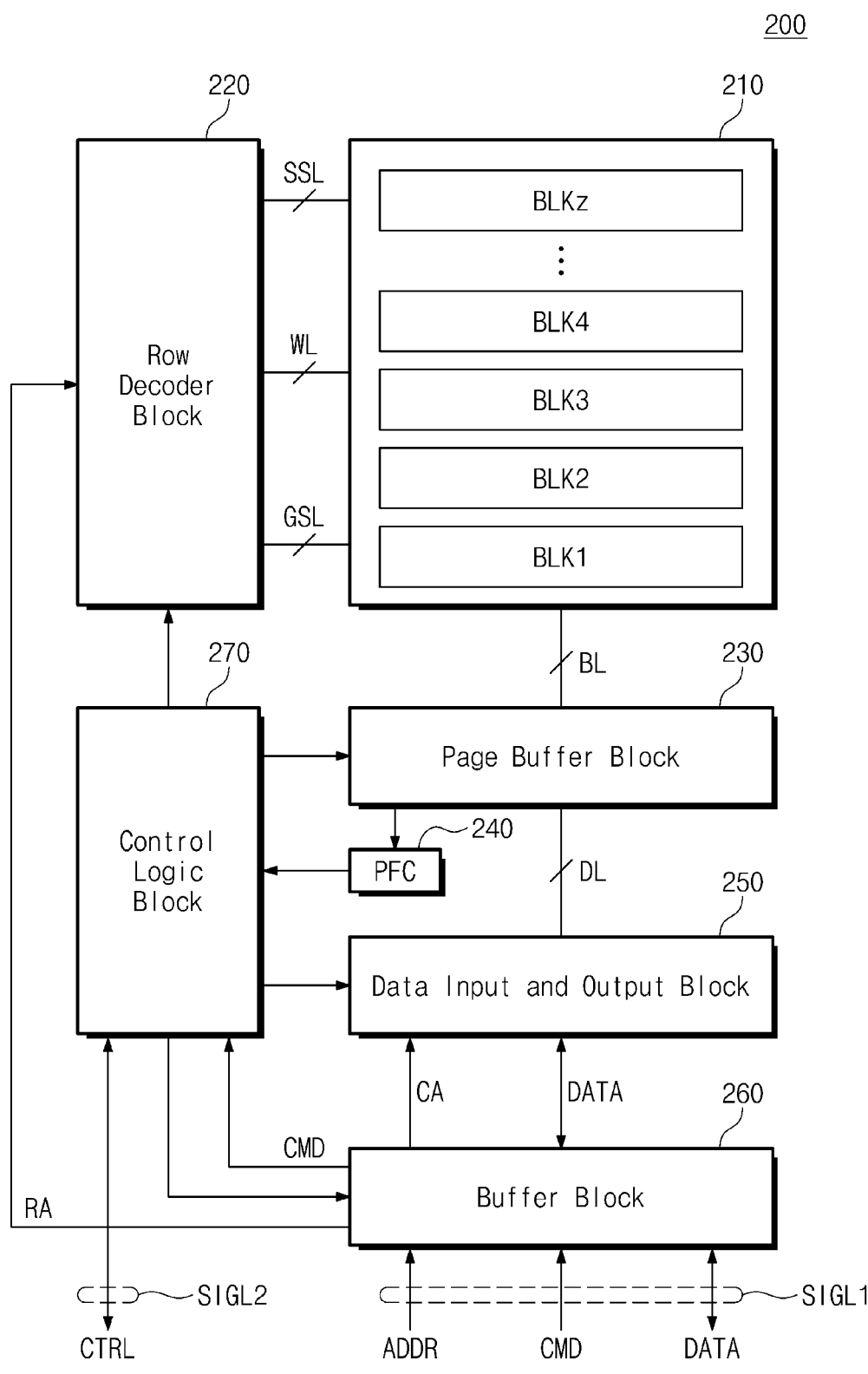
FIG. 3 is a block diagram illustrating a nonvolatile memory device according to an embodiment of the present disclosure.

FIG. 3 is a block diagram illustrating a nonvolatile memory device 200 according to an embodiment of the present disclosure. Referring to FIGS. 2 and 3, the nonvolatile memory device 200 may correspond to the nonvolatile memory device 110 of FIG. 2. The nonvolatile memory device 200 may include a memory cell array 210, a row decoder block 220, a page buffer block 230, a pass/fail check block (PFC) 240, a data input and output block 250, a buffer block 260, and a control logic block 270.

The memory cell array 210 includes the plurality of memory blocks BLK1 to BLKz. Each of the memory blocks BLK1 to BLKz includes a plurality of memory cells. Each of the memory blocks BLK1 to BLKz may be connected to the row decoder block 220 through at least one ground selection line GSL, word lines WL, and at least one string selection line SSL. Some of the word lines WL may be used as dummy word lines. Each of the memory blocks BLK1 to BLKz may be connected to the page buffer block 230 through a plurality of bit lines BL. The plurality of memory blocks BLK1 to BLKz may be connected in common to the plurality of bit lines BL.

In an embodiment, each of the plurality of memory blocks BLK1 to BLKz may correspond to a unit of the erase operation. Memory cells belonging to each memory block may be erased at the same time. As another example, each of the memory blocks BLK1 to BLKz may be divided into a plurality of sub-blocks. Each of the plurality of sub-blocks may correspond to a unit of the erase operation. As another example, two or more memory blocks may constitute one super block. Each super block may correspond to a unit of the erase operation. The unit of the erase operation is referred to as an "erase unit". That is, the erase unit may be a memory block, a sub-block of a memory block, or a super block of memory blocks.

The row decoder block 220 is connected to the memory cell array 210 through the ground selection lines GSL, the word lines WL, and the string selection lines SSL. The row decoder block 220 operates under control of the control logic block 270.

The row decoder block 220 may decode a row address RA received from the buffer block 260 and may control voltages to be applied to the string selection lines SSL, the word lines WL, and the ground selection lines GSL based on the decoded row address.

The page buffer block 230 is connected to the memory cell array 210 through the plurality of bit lines BL. The page buffer block 230 is connected to the data input and output block 250 through a plurality of data lines DL. The page buffer block 230 operates under control of the control logic block 270.

In the program operation, the page buffer block 230 may store data to be written in memory cells. The page buffer block 230 may apply voltages to the plurality of bit lines BL based on the stored data. In the read operation or in the verify read operation that is performed in the program operation or the erase operation, the page buffer block 230 may sense voltages of the bit lines BL and may store a sensing result.

In the verify read operation associated with the program operation or the erase operation, the pass/fail check block 240 may verify the sensing result of the page buffer block 230. For example, in the verify read operation that is performed in the program operation, the pass/fail check block 240 may count the number of values (e.g., the number of Os) corresponding to on-cells that are not programmed to a target threshold voltage or higher.

In the verify read operation that is performed in the erase operation, the pass/fail check block 240 may count the number of values (e.g., the number of Is) corresponding to off-cells that are not erased to a target threshold voltage or lower. When the counting result is greater than or equal to a threshold value, the pass/fail check block 240 may output a fail signal to the control logic block 270. When the counting result is smaller than the threshold value, the pass/fail check block 240 may output a pass signal to the control logic block 270. Depending on the verification result of the pass/fail check block 240, a program loop of the program operation may be further performed, or an erase loop of the erase operation may be further performed.

The data input and output block 250 is connected to the page buffer block 230 through the plurality of data lines DL. The data input and output block 250 may receive a column address CA from the buffer block 260. The data input and output block 250 may output the data read by the page buffer block 230 to the buffer block 260 depending on the column address CA. The data input and output block 250 may provide the data received from the buffer block 260 to the page buffer block 230, based on the column address CA.

Through the first signal lines SIGL1, the buffer block 260 may receive a command CMD and an address ADDR from an external device and may exchange data "DATA" with the external device. The buffer block 260 may operate under control of the control logic block 270. The buffer block 260 may provide the command CMD to the control logic block 270. The buffer block 260 may provide the row address RA of the address ADDR to the row decoder block 220 and may provide the column address CA of the address ADDR to the data input and output block 250. The buffer block 260 may exchange the data "DATA" with the data input and output block 250.

The control logic block 270 may exchange a control signal CTRL with the external device through the second signal lines SIGL2. The control logic block 270 may allow the buffer block 260 to route the command CMD, the address ADDR, and the data "DATA". The control logic block 270 may decode the command CMD received from the buffer block 260 and may control the nonvolatile memory device 200 based on the decoded command.

In an embodiment, the nonvolatile memory device 200 may be manufactured in a bonding method. The memory cell array 210 may be manufactured by using a first wafer, and the row decoder block 220, the page buffer block 230, the pass/fail check block 240, the data input and output block 250, the buffer block 260, and the control logic block 270 may be manufactured by using a second wafer. The nonvolatile memory device 200 may be implemented by coupling the first wafer and the second wafer such that an upper surface of the first wafer and an upper surface of the second wafer face each other.

As another example, the nonvolatile memory device 200 may be manufactured in a cell over pen (COP) method. A peripheral circuit including the row decoder block 220, the page buffer block 230, the pass/fail check block 240, the data input and output block 250, the buffer block 260, and the control logic block 270 may be implemented on a substrate. The memory cell array 210 may be implemented over the peripheral circuit. The peripheral circuit and the memory cell array 210 may be connected by using through vias.

Figure 4:
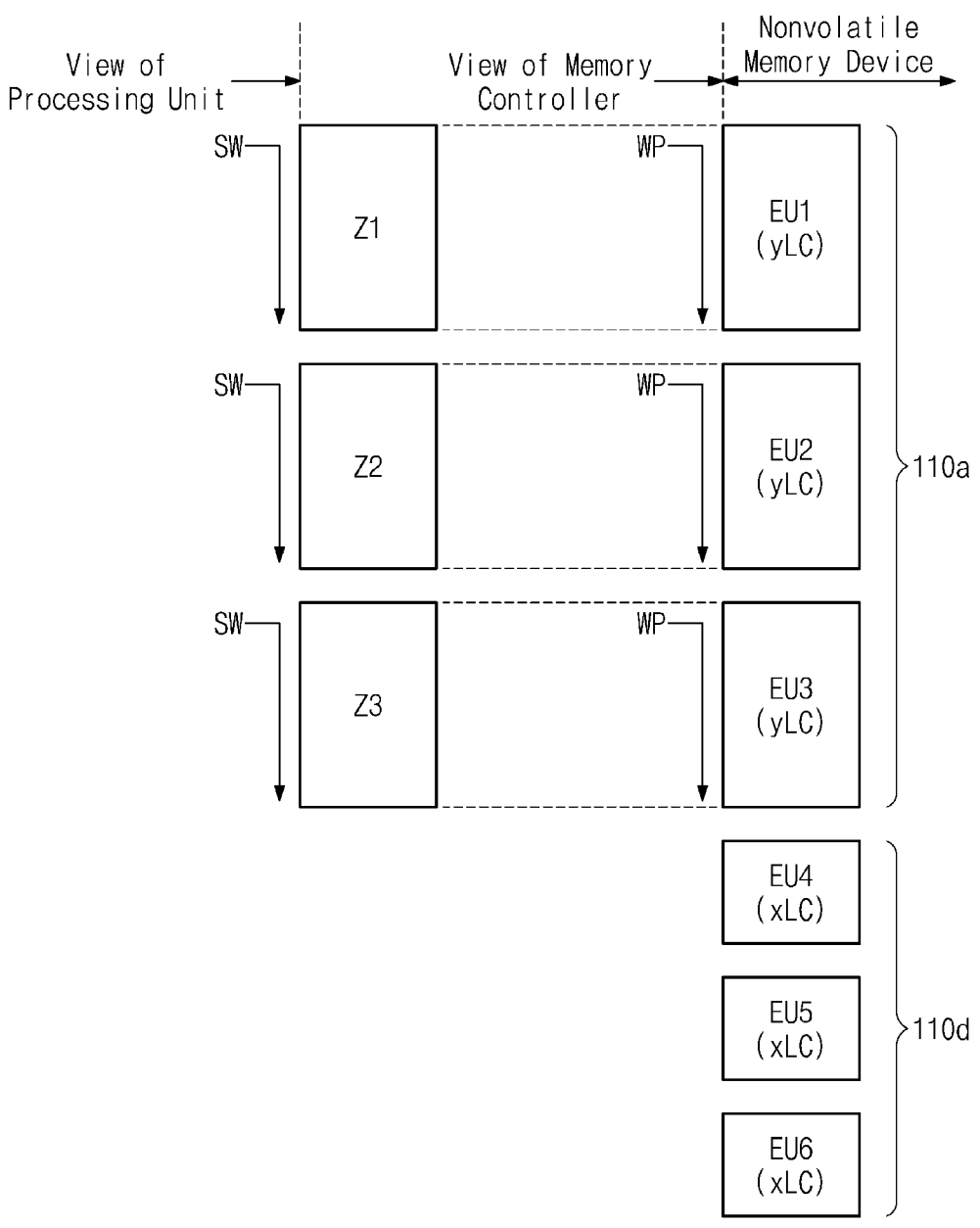
FIG. 4 illustrates an example in which a processing unit allocates zones to a storage device.

FIG. 4 illustrates examples in which the processing unit 12 allocates zones to the storage device 11 or 100. Referring to FIGS. 1, 2, 3, and 4, in view of the processing unit 12, the processing unit 12 may open zones in the first storage region 110a of the storage device 11 or 100. For example, in the initialization operation, the storage device 11 or 100 may provide the processing unit 12 with information about a storage capacity of the erase unit of the first storage region 110*a*. The processing unit 12 may open zones based on the storage capacity of the erase unit of the first storage region 110*a*.

When the processing unit 12 opens the zones, in view of the memory controller 120, the memory controller 120 of the storage device 11 or 100 may allocate zones to the erase units of the nonvolatile memory device 110 or 200, respectively. For example, the processing unit 12 may transfer open requests to the memory controller 120 such that a first zone Z1, a second zone Z2, and a third zone Z3 for the first storage region 1Ta or 110*a* of the storage device 11 or 100 are opened. The memory controller 120 may allocate the first zone Z1, the second zone Z2, and the third zone Z3 to a first erase unit EU1, a second erase unit EU2, and a third erase unit EU3 of the nonvolatile memory device 110 or 200, respectively.

Each of the first erase unit EU1, the second erase unit EU2, and the third erase unit EU3 may include a plurality of memory cells that are used as a y-level cell yLC. Herein, "y" may be a positive integer. Each memory cell that is used as the y-level cell yLC may store "y" bits.

The processing unit 12 may independently access (e.g., perform the write or read operation on) the first zone Z1, the second zone Z2, and the third zone Z3. The processing unit 12 may perform only a sequential write SW in each of the first zone Z1, the second zone Z2, and the third zone Z3. For example, the processing unit 12 may write data in each of the first zone Z1, the second zone Z2, and the third zone Z3, based on sequential logical addresses. For example, the first zone Z1, the second zone Z2, and the third zone Z3 may respectively correspond to different applications that are executable by the processing unit 12.

In response to the sequential write SW of the processing unit 12, the memory controller 120 may manage a write pointer WP for each of the first erase unit EU1 allocated for the first zone Z1, the second erase unit EU2 allocated for the second zone Z2, and the third erase unit EU3 allocated for the third zone Z3. The write pointer WP may point out a next position (e.g., a page) where data are to be written.

As data are written at a page pointed out by the write pointer WP, the memory controller 120 may update the write pointer WP so as to indicate a next page. That is, the data written in each of the first erase unit EU1, the second erase unit EU2, and the third erase unit EU3 may correspond to sequential physical addresses. Accordingly, the data that the processing unit 12 writes in each of the first zone Z1, the second zone Z2, and the third zone Z3 may correspond to sequential logical addresses and sequential physical addresses.

The data that are requested by the processing unit 12 so as to be written in each of the first zone Z1, the second zone Z2, and the third zone Z3 may be designated to be finally written in each of the first erase unit EU1, the second erase unit EU2, and the third erase unit EU3 respectively corresponding to the first zone Z1, the second zone Z2, and the third zone Z3. In an embodiment, the description is given as each zone is allocated to one erase unit, but the number of erase units allocated for each zone may be two or more.

Before the data that are requested by the processing unit 12 so as to be written in each of the first zone Z1, the second zone Z2, and the third zone Z3 are finally written in each of the first erase unit EU1, the second erase unit EU2, and the third erase unit EU3 respectively corresponding to the first zone Z1, the second zone Z2, and the third zone Z3, the memory controller 120 may buffer the write data by using erase units of the fourth storage region 110*d*.

For example, the memory controller 120 may use a fourth erase unit EU4, a fifth erase unit EU5, and a sixth erase unit EU6 of the fourth storage region 110*d* for buffering. The memory controller 120 may use memory cells of the fourth erase unit EU4, the fifth erase unit EU5, and the sixth erase unit EU6 of the fourth storage region 110*d*, which are used for buffering, as an x-level cell xLC. Herein, "x" may be a positive integer less than y.

The storage capacity of the x-level cell xLC may be smaller than the storage capacity of the y-level cell yLC. Accordingly, the size of each of the fourth erase unit EU4, the fifth erase unit EU5, and the sixth erase unit EU6 of the fourth storage region 110*d* is illustrated as being smaller than the size of each of the first erase unit EU1, the second erase unit EU2, and the third erase unit EU3.

The write speed of the x-level cell xLC may be faster than the write speed of the y-level cell yLC. Accordingly, the write speed of the fourth erase unit EU4, the fifth erase unit EU5, and the sixth erase unit EU6 of the fourth storage region 110*d* used for buffering may be faster than the write speed of the first erase unit EU1, the second erase unit EU2, and the third erase unit EU3 in which the data are finally to be written. The write speed of the storage device 11 or 100 may be improved by performing buffering by using the fourth storage region 110*d*.

In an embodiment, the processing unit 12 may play a leading role in managing the data that are finally written in the first erase unit EU1, the second erase unit EU2, and the third erase unit EU3 respectively corresponding to the first zone Z1, the second zone Z2, and the third zone Z3. For example, except for the case where a read reclaim is required due to occurrence of a bad block or reduction of reliability, the processing unit 12 may play a leading role in a data management operation such as data copy, data discard (invalidation or zone reset) of a zone unit, and garbage collection of a zone unit.

The memory controller 120 may play a leading role in managing the data written (or buffered) in the fourth erase unit EU4, the fifth erase unit EU5, and the sixth erase unit EU6 of the fourth storage region 110*d*. Even without an explicit request from the processing unit 12, the memory controller 120 may internally perform data copy, data garbage collection, or data migration with respect to the fourth erase unit EU4, the fifth erase unit EU5, and the sixth erase unit EU6.

Because the zone-based data management operation is performed by the processing unit 12, the storage device 11 or 100 may prevent the write amplification factor WAF from increasing by internally performing the data management operation.

In an embodiment, data that are requested by the processing unit 12 so as to be written in an arbitrary zone may be written in the erase unit of the first storage region 110*a*, which is allocated to a specific zone by the memory controller 120. In the process where the memory controller 120 writes the data in the erase unit of the first storage region 110*a*, the memory controller 120 may buffer the data by using the external buffer 130 (or the internal buffer 123) or the erase units of the fourth storage region 110*d*. Below, data that are requested by the processing unit 12 so as to be written in an arbitrary zone are regarded as being written in an arbitrary zone in view of the processing unit 12, regardless of whether the data are being buffered.

Figure 5:
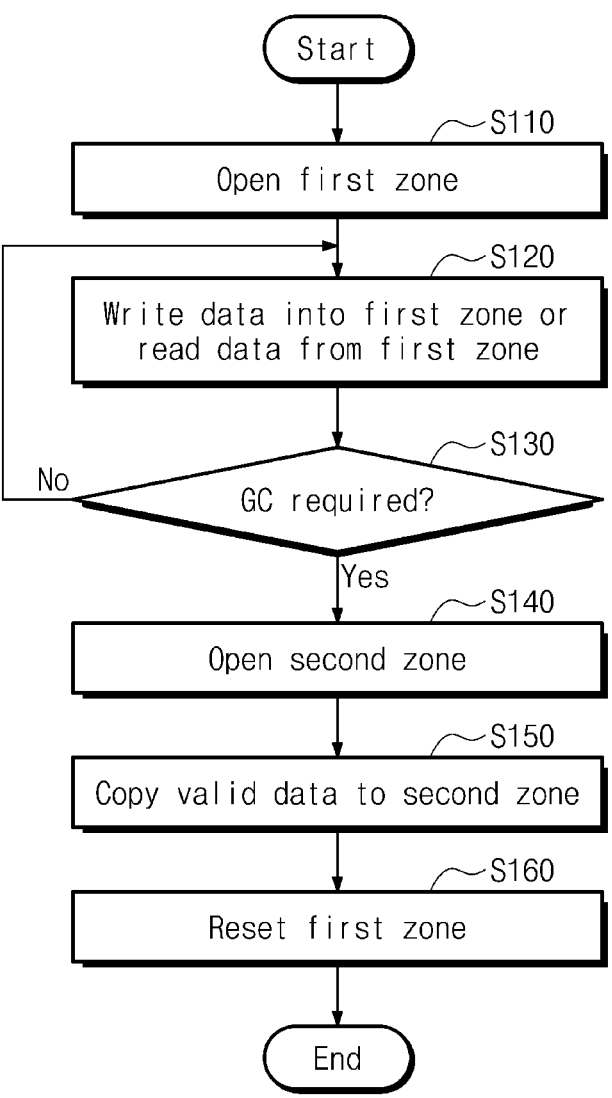
FIG. 5 illustrates an example in which an electronic device manages one zone.

FIG. 5 illustrates an example in which the electronic device 10 manages one zone. Referring to FIGS. 1, 2, and 5, in operation S110, the processing unit 12 may open a first zone. For example, the processing unit 12 may open the first zone by transmitting the open request for the first zone to the memory controller 120 or transmitting the first write request for the first zone to the memory controller 120. The memory controller 120 may allocate at least one of the erase units of the first storage region 110a of the nonvolatile memory device 110 to the first zone.

In operation S120, the processing unit 12 may write data in the first zone or may read data from the first zone. The processing unit 12 may access the first zone by transmitting the write request or read request for the first zone to the memory controller 120. The processing unit 12 may request a write operation of the first zone based on sequential logical addresses. The memory controller 120 may finally write the data corresponding to the sequential logical addresses at sequential physical addresses of at least one erase unit of the first storage region 110a, which is allocated to the first zone (e.g., after buffering the data).

In operation S130, the processing unit 12 may determine whether garbage collection is required. For example, the processing unit 12 may determine whether zone-based garbage collection is required. When the first zone does not require garbage collection, the processing unit 12 may continuously access the first zone in operation S120.

When the first zone requires garbage collection, in operation S140, the processing unit 12 may open a second zone. In operation S150, the processing unit 12 may copy valid data to the second zone.

In an embodiment, the processing unit 12 may open the second zone by transmitting the open request for the second zone to the memory controller 120. As another example, the processing unit 12 may open the second zone by using the write request for the copy in operation S150, which is made with respect to the second zone for the first time. As the second zone is opened, the memory controller 120 may allocate at least one of the erase units of the first storage region 110a to the second zone. For example, the at least one erase unit allocated to the first zone may be different from the at least one erase unit allocated to the second zone.

In an embodiment, during the zone-based garbage collection, the processing unit 12 may copy only valid data among the data present in the first zone to the second zone. Alternatively, during the zone-based garbage collection, the processing unit 12 may integrate valid data of two or more zones by using the second zone (e.g., a single zone).

In an embodiment, the valid data of the first zone (or a specific zone) may refer to data that are not invalid data. The invalid data of the first zone may be data that are determined as being not required by the processing unit 12 any longer after being written in the first zone. The invalid data of the first zone (or the specific zone) may be determined by the processing unit 12, and the memory controller 120 or the storage device 11 or 100 may fail to identify the invalid data of the first zone (or the specific zone).

In operation S160, the processing unit 12 may reset the first zone. For example, the processing unit 12 may reset the first zone by transmitting the reset request for the first zone to the memory controller 120. When valid data of two or more zones are integrated in the second zone, the processing unit 12 may transmit the reset requests for the two or more zones to the memory controller 120.

The memory controller 120 may identify data of the erase unit of the first storage region 110a, which is allocated to the first zone, as invalid data, based on the reset request for the first zone. Alternatively, the memory controller 120 may identify data of the erase units of the first storage region 110a, which are allocated to the two or more zones, as invalid data, based on the reset requests for the two or more zones. The memory controller 120 may secure a free erase unit by erasing the erase unit(s) of the first storage region 110a, which includes only invalid data.

Figure 6:
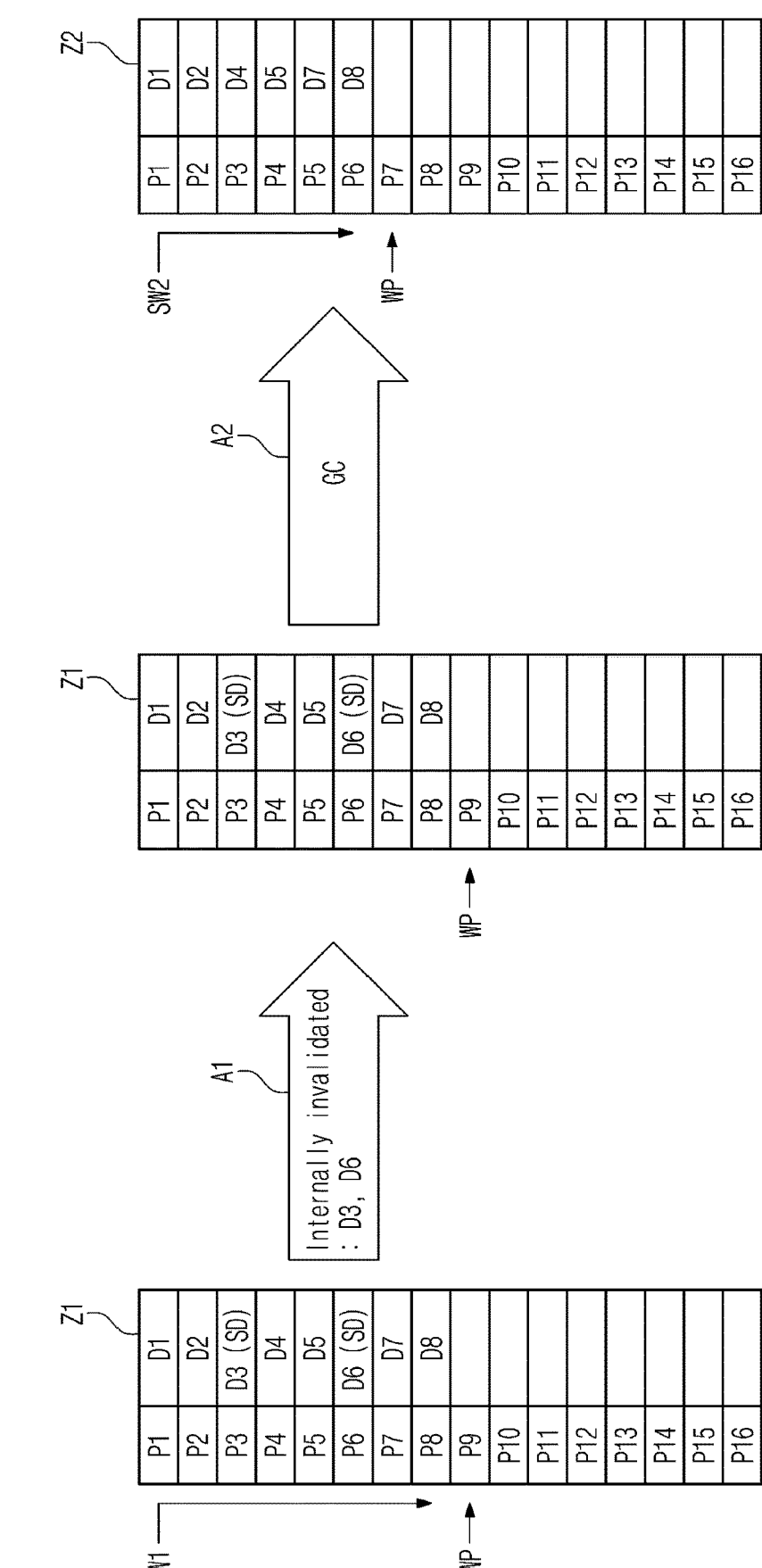
FIG. 6 illustrates an example of a lifetime of data written in a first zone.

FIG. 6 illustrates an example of a lifetime of data written in the first zone Z1. Referring to FIGS. 1, 2, and 6, the first zone Z1 may include 1st to 16th page P1 to P16. Through a first sequential write SW1, the processing unit 12 may request the memory controller 120 to write first to eighth page data D1 to D8 at the 1st to 8th pages P1 to P8 of the first zone Z1. Through the first sequential write SW1, the memory controller 120 may sequentially write the first to eighth page data D1 to D8 at the 1st to 8th pages P1 to P8 of the erase unit allocated to the first zone Z1. After the first sequential write SW1, the write pointer WP of the first zone Z1 may point out the 9th page P9 of the first zone Z1.

In an embodiment, the third page data D3 and the sixth page data D6 may be secure data SD. The secure data SD may be data, which requires relatively high security, such as personal information, an encryption key, and certificate information. When the secure data SD thus written are not required, as shown by a first arrow A1, the processing unit 12 may internally invalidate the secure data SD including the third page data D3 and the sixth page data D6.

Because there is a need to guarantee logical addresses are sequential and physical addresses of the data written in the first zone Z1, even though the processing unit 12 internally invalidates the secure data SD including the third page data D3 and the sixth page data D6, the secure data SD including the third page data D3 and the sixth page data D6 may be managed as valid data in the first file system FS1 or the second file system FS2.

The processing unit 12 may internally invalidate the secure data SD including the third page data D3 and the sixth page data D6 by preventing the operating system and the applications executed by the processing unit 12 from accessing the secure data SD including the third page data D3 and the sixth page data D6.

As shown by a second arrow A2, when performing garbage collection of the first zone Z1, the processing unit 12 may request the memory controller 120 to write the following in the second zone Z2: the first and second page data D1 and D2, the fourth and fifth page data D4 and D5, and the seventh and eighth page data D7 and D8, that is, the remaining page data other than the third page data D3 and the sixth page data D6 internally invalidated from among the first to eighth page data D1 to D8 written in the first zone Z1.

Through a second sequential write SW2, the memory controller 120 may sequentially write the first and second page data D1 and D2, the fourth and fifth page data D4 and D5, and the seventh and eighth page data D7 and D8 at the 1st to 6th pages P1 to P6 of the erase unit allocated to the second zone Z2. After the second sequential write SW2, the write pointer WP of the first zone Z1 may point out the 7th page P7 of the second zone Z2.

When the garbage collection of the first zone Z1 is completed, that is, when all the valid data of the first zone Z1 are copied to the second zone Z2, the processing unit 12 may reset the first zone Z1 (refer to operation S160 of FIG. 5). When the first zone Z1 is reset, the memory controller 120 may manage all the data written in the first zone Z1 (or all the data written in the erase unit allocated to the first zone Z1) as invalid data and may prohibit the access to the data written in the first zone Z1 (or the data written in the erase unit allocated to the first zone Z1).

As described with reference to FIG. 6, even though the processing unit 12 internally invalidates the data written in the first zone Z1 (or an arbitrary specific zone) due to a need such as security, the data written in the first zone Z1 may be maintained as valid data in the first zone Z1 (or the arbitrary zone) until the first zone Z1 (or the arbitrary zone) is reset. When the data are maintained as valid data in the first zone Z1 (or the arbitrary zone), the data may be read from the storage device 11 or 100 anytime. That is, the security of data may be reduced.

Figure 7:
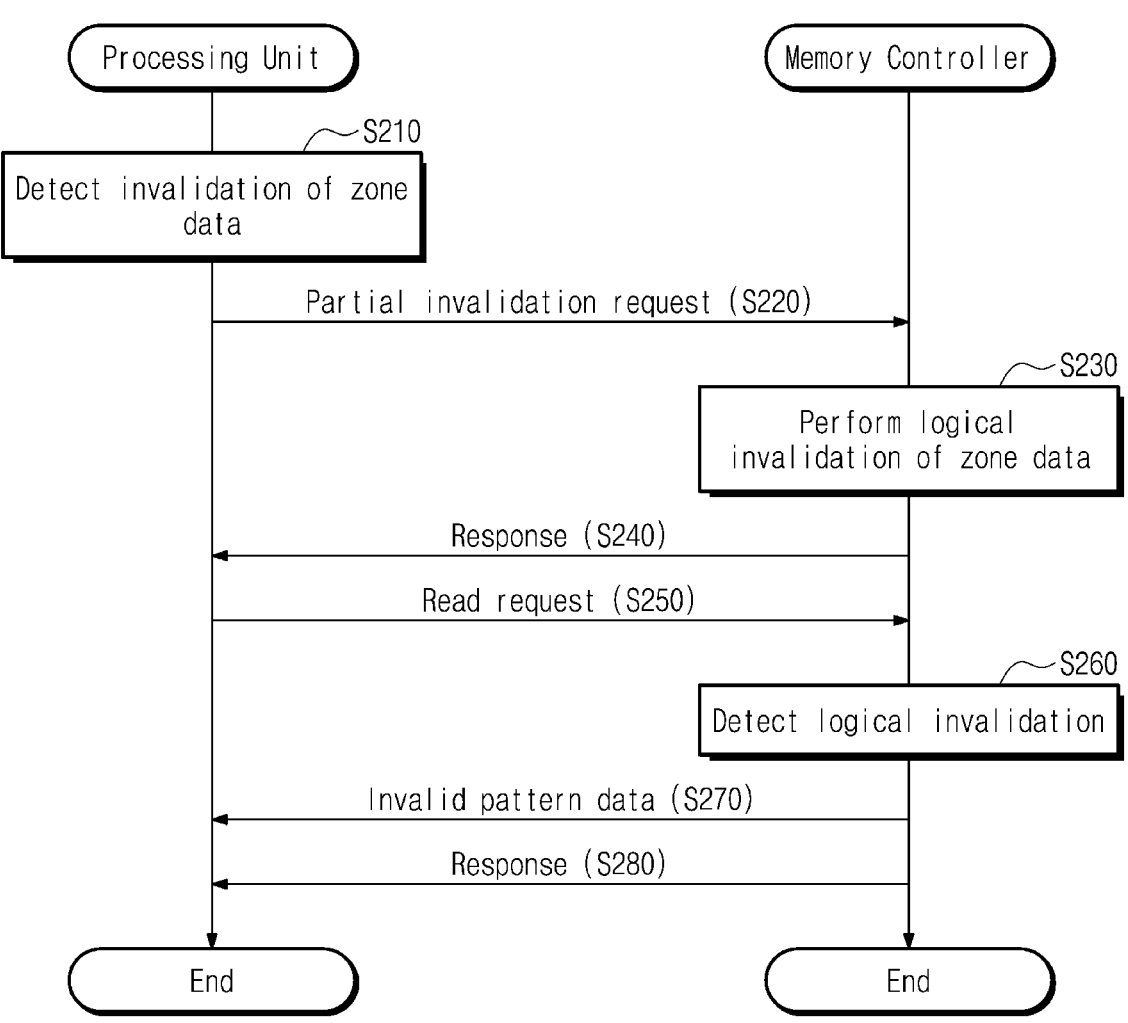
FIG. 7 illustrates an example in which an electronic device performs partial invalidation.

FIG. 7 illustrates an example in which the electronic device 10 performs partial invalidation. Referring to FIGS. 1, 2, and 7, in operation S210, the processing unit 12 may detect invalidation of zone data. For example, the processing unit 12 may detect data internally invalidated from among the data written in the specific zone. For example, after writing secure data in a zone and using the secure data written in the zone, the processing unit 12 may detect that there is a need to invalidate the secure data to maintain the security of the secure data.

In operation S220, the processing unit 12 may transmit a partial invalidation request to the memory controller 120. For example, the partial invalidation request may be used to invalidate a portion of the data written in the zone. For example, the partial invalidation request may be transmitted through the UPIU (UFS Protocol Information Unit), for example, the command UPIU, or in compliance with any other appropriate format.

In an embodiment, the partial invalidation request may include a logical address or logical addresses targeted for partial invalidation. The partial invalidation request may include a logical address range or logical address ranges targeted for partial invalidation. The logical address range may include a start logical address and a length. When the partial invalidation request includes information about two or more invalidation targets, the partial invalidation request may include information about the total length of a parameter indicating a partial invalidation target, for example, a parameter list length.

The partial invalidation request (or command) may be called variously. For example, the partial invalidation request may be expressed by using various and similar terms such as an unmap request (or command), a partial unmap request (or command), a discard request (or command), a partial discard request (or command), a delete request (or command), a partial delete request (or command), an erase request (or command), and a partial erase request (or command).

In operation S230, the memory controller 120 may perform logical invalidation of zone data. For example, based on the partial invalidation request, the memory controller 120 may manage partial invalidation-requested data as invalid data. The memory controller 120 may manage the partial invalidation-requested data as invalid data while maintaining the sequential aspect of logical addresses and physical addresses of the zone data written in the zone.

In operation S240, the memory controller 120 may transmit a response to the processing unit 12. For example, the response may be transferred to the processing unit 12 through the response UPIU or in compliance with any other appropriate format. The response may include information (e.g., success or fail) about a partial invalidation result.

In operation S250, the processing unit 12 may transmit the read request to the memory controller 120. For example, the read request may be transferred to the memory controller 120 through the command UPIU or in compliance with any other appropriate format. For example, the read request may include a logical address of the partially invalidated data and may be used to read the partially invalidated data.

In operation S260, the memory controller 120 may detect logical invalidation. For example, the memory controller 120 may detect that the read-requested data are logically invalidated data.

In operation S270, the memory controller 120 may transmit invalid pattern data to the processing unit 12. For example, based on detecting that the read-requested data are logically invalidated data, the memory controller 120 may transmit the invalid pattern data to the processing unit 12. The invalid pattern data may be pattern data, which are irrelevant to the original data, such as specific pattern data, arbitrary pattern data, dummy pattern data, or random pattern data.

In operation S280, the memory controller 120 may transmit a response to the processing unit 12. For example, the response may be transferred to the processing unit 12 through the response UPIU or in compliance with any other appropriate format. The response may include information about a read request result (e.g., information indicating invalid data).

As described with reference to FIG. 7, the processing unit 12 may request partial invalidation for a portion of the zone data from the memory controller 120 while maintaining the sequential aspect of the logical addresses and the physical addresses of the zone data written in the zone. The memory controller 120 may invalidate a portion of the zone data while maintaining the sequential aspect of the logical addresses and the physical addresses of the zone data written in the zone. When the read request for the invalidated data is made, the memory controller 120 may return the invalid pattern data to the processing unit 12. Accordingly, as a portion of zone data written in a zone is invalidated even before the zone is reset, the security of the zone data written in the zone may be improved.

Figure 8:
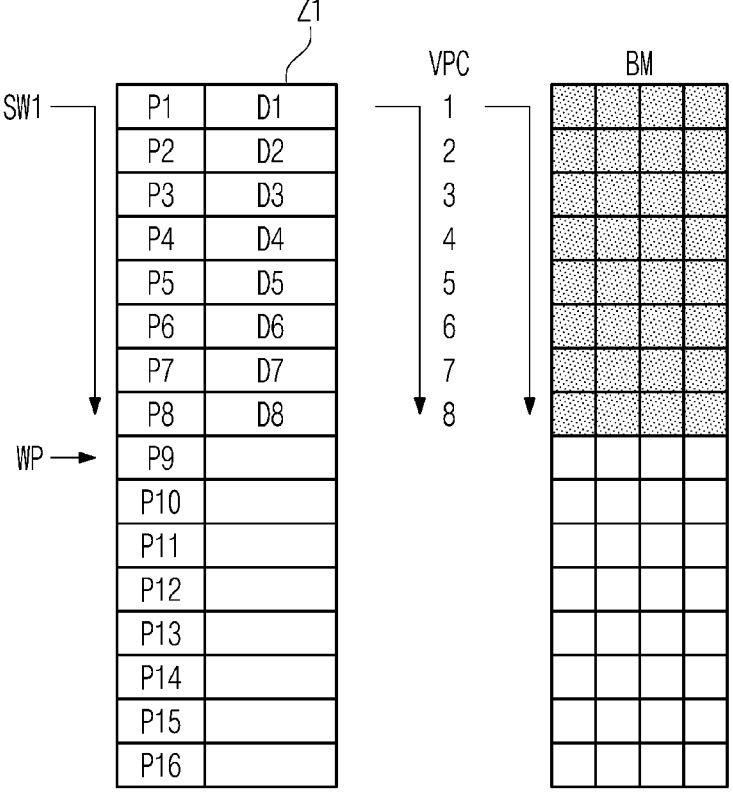
FIG. 8 is a diagram illustrating an example in which an electronic device writes data in a first zone.

FIG. 8 is a diagram illustrating an example in which the electronic device 10 writes data in the first zone Z1. Referring to FIGS. 1, 2, and 8, the first zone Z1 may include the 1st to 16th page P1 to P16. The processing unit 12 may request the memory controller 120 to perform the first sequential write SW1 in which the first to eighth page data D1 to D8 are sequentially written at the 1st to 8th pages P1 to P8 of the first zone Z1. After the first sequential write SW1 is performed, the write pointer WP of the first zone Z1 may point out the 9th page P9.

When the first to eighth page data D1 to D8 are sequentially written at the 1st to 8th pages P1 to P8 of the first zone Z1 through the first sequential write SW1, the memory controller 120 may sequentially increase a valid page count VPC of the first zone Z1 from "1" to "8". The valid page count VPC may indicate the number of valid pages storing valid data from among pages of the relevant zone.

Each page of the first zone Z1 may correspond to two or more logical addresses. In an embodiment, each page of the first zone Z1 may correspond to four logical addresses. A bitmap BM may indicate invalid or valid information of data written at the logical addresses belonging to each page.

When one page of the first zone Z1 corresponds to four logical addresses, four bits of the bitmap BM may be mapped to one page of the first zone Z1. Four bits corresponding to one page may correspond to one row. When the first to eighth page data D1 to D8 are sequentially written at the 1st to 8th pages P1 to P8 of the first zone Z1 through the first sequential write SW1, the memory controller 120 may set values of bits of the first to eighth rows of the bitmap BM to valid values. For example, in FIG. 8, dotted boxes may indicate the bits of the bitmap BM corresponding to the valid values. In FIG. 8, empty boxes may indicate the bits of the bitmap BM corresponding to invalid values.

When the first to eighth page data D1 to D8 are sequentially written at the 1st to 8th pages P1 to P8 of the first zone Z1 through the first sequential write SW1, the memory controller 120 may generate a map table MT.

For example, the memory controller 120 may write data corresponding to a first logical address group LBA[1] at the 1st page P1 and may map the first logical address group LBA[1] to the first page P1. When one page of the first zone Z1 corresponds to four logical addresses, the first logical address group LBA[1] may include four logical addresses that are consecutive. Each of the logical addresses of the first logical address group LBA[1] may be mapped to a physical address and a position offset of the first page P1.

The memory controller 120 may write data corresponding to a k-th logical address group LBA[k] (k being a positive integer) at the k-th page Pk and may map the k-th logical address group LBA[k] to the k-th page Pk. The k-th logical address group LBA[k] may include four logical addresses that are continuous to the last logical address of a (k−1)-th logical address group LBA[k−1] and are consecutive. Each of the logical addresses of the k-th logical address group LBA[k] may be mapped to a physical address and a position offset of the k-th page Pk.

For example, the memory controller 120 may write data corresponding to an eighth logical address group LBA[8] at the 8th page P8 and may map the eighth logical address group LBA[8] to the 8th page P8. The eighth logical address group LBA[8] may include four logical addresses that are continuous to the last logical address of a seventh logical address group LBA[7] and are consecutive. Each of the logical addresses of the eighth logical address group LBA[8] may be mapped to a physical address and a position offset of the 8th page P8.

Figure 9:
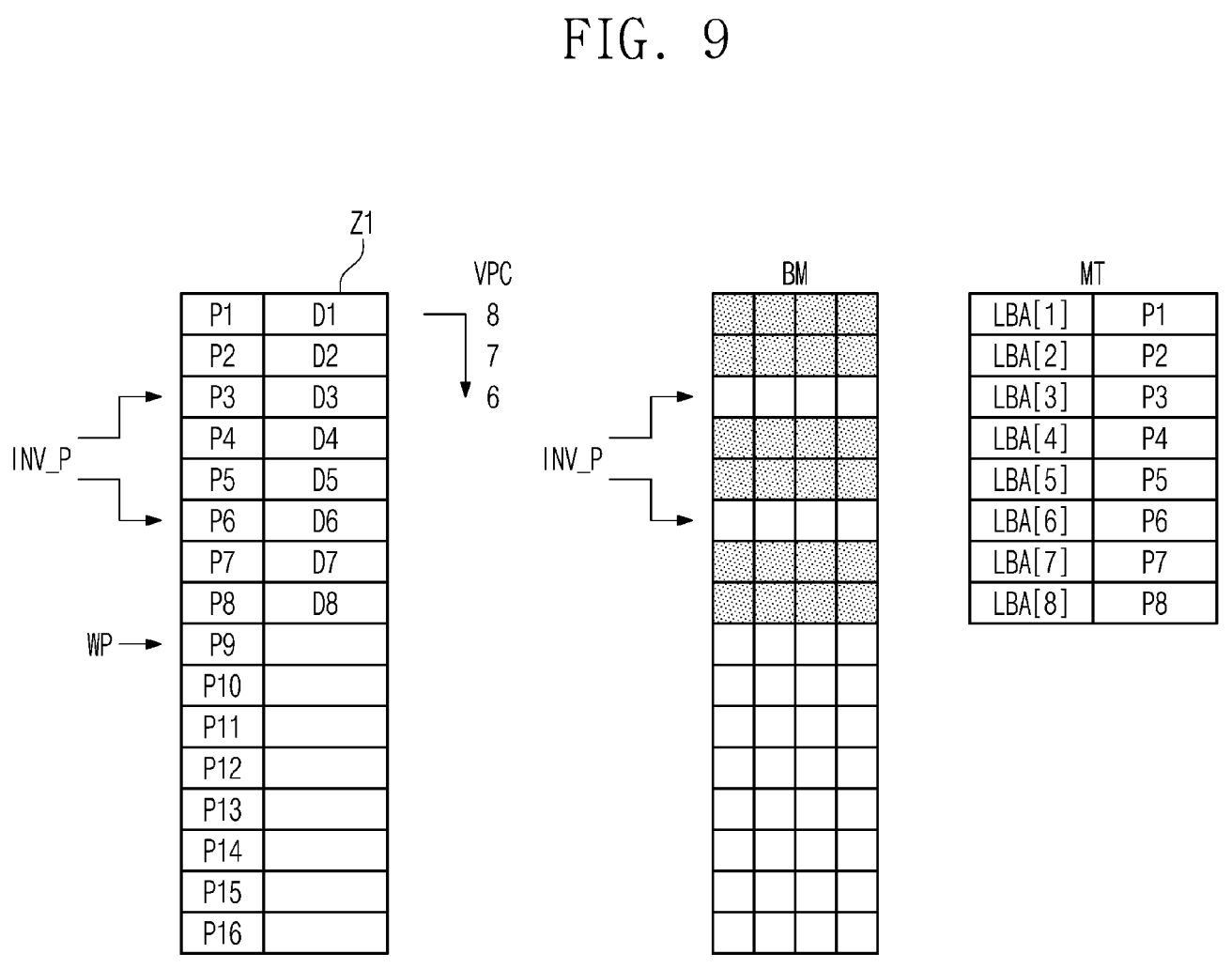

FIG. 9 is a diagram illustrating an example in which the electronic device 10 performs partial invalidation with respect to data of the first zone Z1. In an embodiment, an example in which partial invalidation is performed with respect to data written in the first zone Z1 of FIG. 8 is illustrated in FIG. 9.

Referring to FIGS. 1, 2, and 9, the processing unit 12 may transmit, to the memory controller 120, the partial invalidation request for the third and sixth page data D3 and D6 written at the 3rd and 6th pages P3 and P6 from among the first to eighth page data D1 to D8 written in the first zone Z1. Based on the partial invalidation request, the memory controller 120 may perform partial invalidation INV_P such that the third and sixth page data D3 and D6 are managed as invalid data.

As the memory controller 120 performs the partial invalidation INV_P for managing the third and sixth page data D3 and D6 as invalid data, the memory controller 120 may manage the 3rd and 6th pages P3 and P6 of the first zone Z1 as storing invalid data. Accordingly, the memory controller 120 may decrease the valid page count VPC of the first zone Z1 from "8" to "6".

As the memory controller 120 performs the partial invalidation INV_P for managing the third and sixth page data D3 and D6 as invalid data, the memory controller 120 may update values of bits of the bitmap BM corresponding to the 3rd page P3 and bits of the bitmap BM corresponding to the 6th page P6, so as to be changed to the invalid values.

Even when performing the partial invalidation INV_P, the memory controller 120 may maintain the map table MT without update. Accordingly, the sequential aspect of logical addresses and physical addresses may be guaranteed in the first zone Z1.

That is, even though the partial invalidation INV_P is performed, the memory controller 120 may maintain the map table MT such that the sequential aspect of logical addresses and physical addresses of the first zone Z1 is maintained. Even after the partial invalidation INV_P is performed, the processing unit 12 may transmit the read request to the memory controller 120 based on the third logical address group LBA[3] and the sixth logical address group LBA[6]. The memory controller 120 may not process the read request based on the third logical address group LBA[3] and the sixth logical address group LBA[6] as an error.

When the read request based on the third logical address group LBA[3] and the sixth logical address group LBA[6] is received, the memory controller 120 may determine that the received read request is a read request for partially invalidated data, with reference to the valid page count VPC and the bitmap BM. The memory controller 120 may transmit the invalid pattern data to the processing unit 12 (refer to operation S260 of FIG. 7), and thus, the original data whose portion is invalided may be prevented from being leaked out.

Figure 10:
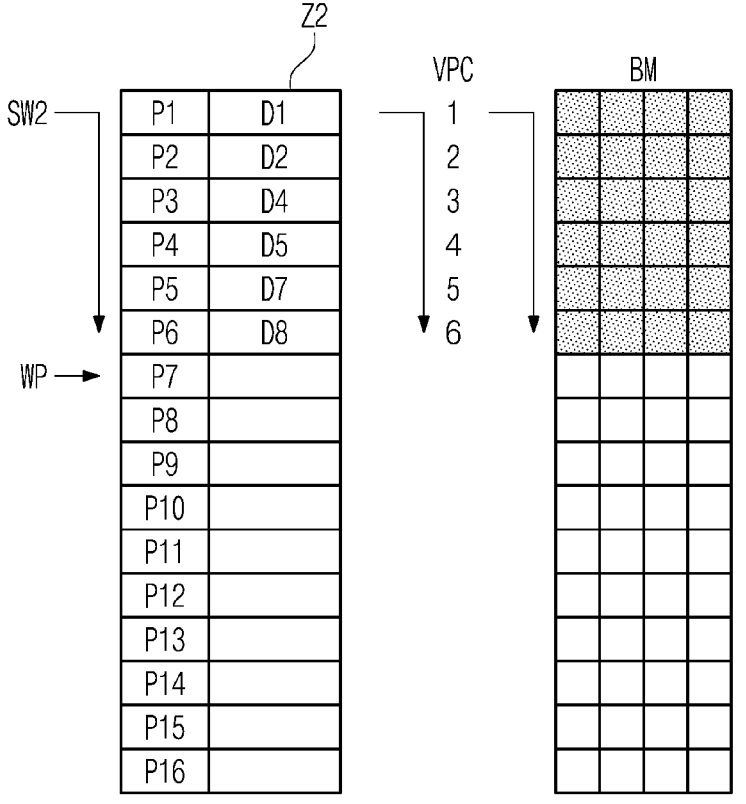
FIG. 10 is a diagram illustrating an example in which valid data of a first zone are copied to a second zone by garbage collection.

FIG. 10 is a diagram illustrating an example in which valid data of the first zone Z1 are copied to the second zone Z2 by garbage collection. Referring to FIGS. 1, 2, and 10, through the second sequential write SW2, the memory controller 120 may sequentially write valid page data among the first to eighth page data D1 to D8 of the first zone Z1, that is, the first and second page data D1 and D2, the fourth and fifth page data D4 and D5, and the seventh and eighth page data D7 and D8 at the 1st to 6th pages P1 to P6 of the second zone Z2.

As the first and second page data D1 and D2, the fourth and fifth page data D4 and D5, and the seventh and eighth page data D7 and D8 are sequentially written at the 1st to 6th pages P1 to P6 of the second zone Z2 through the second sequential write SW2, the memory controller 120 may sequentially increase the valid page count VPC of the second zone Z2 from "1" to "6".

As the first and second page data D1 and D2, the fourth and fifth page data D4 and D5, and the seventh and eighth page data D7 and D8 are sequentially written at the 1st to 6th pages P1 to P6 of the second zone Z2 through the second sequential write SW2, the memory controller 120 may set bits of the first to sixth rows of the bitmap BM to valid values.

As the first and second page data D1 and D2, the fourth and fifth page data D4 and D5, and the seventh and eighth page data D7 and D8 are sequentially written at the 1st to 6th pages P1 to P6 of the second zone Z2 through the second sequential write SW2, the memory controller 120 may generate the map table MT in which the first to sixth logical address groups LBA[1] to LBA[6] are mapped to the 1st to 6th pages P1 to P6.

In an embodiment, while garbage collection is performed, some of logical addresses allocated to a plurality of page data may be updated. For example, to guarantee the sequential aspect of logical addresses and physical addresses, the third logical address group LBA[3] given to the third page data D3 of the invalidated zone, that is, the first zone Z1 may be given to any other page data, for example, the fourth page data D4 written at the 3rd page P3 of the second zone Z2.

The fourth logical address group LBA[4] given to the fourth page data D4 of the first zone Z1 may be given to any other page data, for example, the fifth page data D5 written at the 4th page P4 of the second zone Z2.

The fifth logical address group LBA[5] given to the fifth page data D5 of the first zone Z1 may be given to any other page data, for example, the seventh page data D7 written at the 5th page P5 of the second zone Z2.

The sixth logical address group LBA[6] given to the sixth page data D6 of the invalidated zone, that is, the first zone Z1 may be given to any other page data, for example, the eighth page data D8 written at the 6th page P6 of the second zone Z2.

The seventh and eighth logical address groups LBA[7] and LBA[8] given to the seventh and eighth page data D7 and D8 of the first zone Z1 may not be given to data copied to the second zone Z2. In an embodiment, after garbage collection is completed, the data written in the second zone Z2 may have the seventh logical address group LBA[7].

When garbage collection is completed, the processing unit 12 may transmit the reset request for the first zone Z1 to the memory controller 120. Based on the reset request, the memory controller 120 may manage all the data written in the first zone Z1 as invalid data. The memory controller 120 may physically erase the data of the reset zone by erasing the erase unit allocated to the reset zone.

As described above, the memory controller 120 may manage the partially invalidated data as logically invalid data by using the valid page count VPC or the bitmap BM while maintaining the original data of the partially invalidated data in the nonvolatile memory device 110. As the memory controller 120 manages partial data as invalid data in response to the partial invalidation request, the memory controller 120 may improve the security of data written in the first zone Z1.

When the first zone Z1 is reset, the memory controller 120 may manage all the data written in the first zone Z1 as invalid data and may delete the map table MT of the first zone Z1. That is, as the memory controller 120 manages the original data as invalid data based on the partial invalidation request and physically erases or removes the original data of the nonvolatile memory device 110 when the first zone Z1 is reset or after the first zone Z1 is reset (e.g., through garbage collection), the security of data written in the first zone Z1 may be improved.

Figure 11:
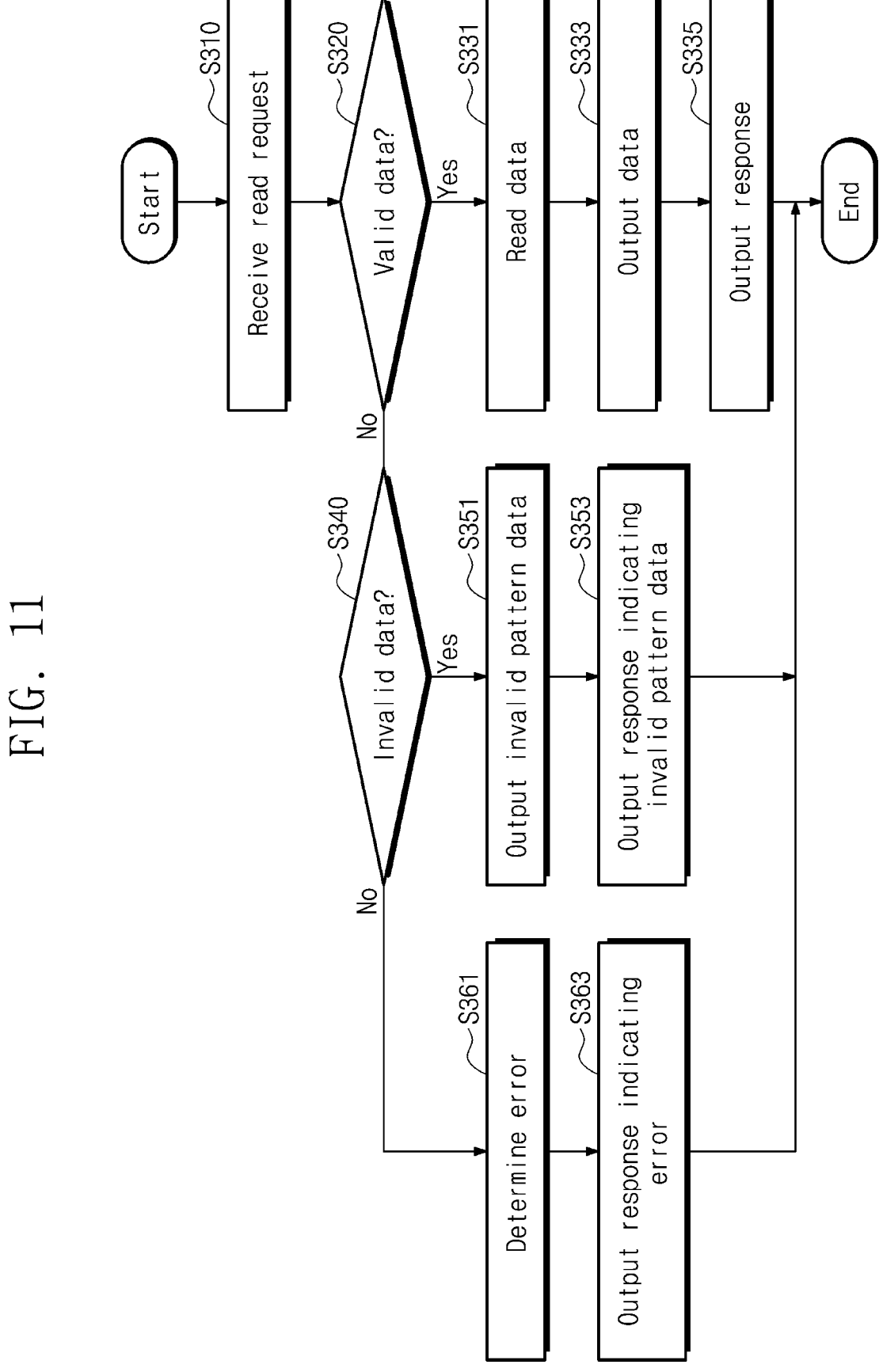
FIG. 11 is a diagram illustrating an example in which a storage device processes a read request.

FIG. 11 is a diagram illustrating an example in which the storage device 11 or 100 processes a read request. Referring to FIGS. 1, 2, and 11, in operation S310, the storage device 11 or 100 may receive the read request from the processing unit 12. For example, the memory controller 120 may receive the read request from the processing unit 12.

In operation S320, the memory controller 120 may determine whether the received read request is associated with valid data. For example, the memory controller 120 may determine a target zone of the read request based on the received read request. The memory controller 120 may determine whether the read request is associated with valid data, based on a logical address(es) included in the received read request, the valid page count VPC of the target zone, and the bitmap BM of the target zone. For example, when the logical address of the read request corresponds to a logical address of valid data of the target zone, the read request may be determined as being associated with valid data. When the logical address of the read request does not correspond to the logical address of the valid data of the target zone, the read request may be determined as being not associated with valid data.

When the read request is associated with valid data, in operation S331 to operation S335, the memory controller 120 may read valid data. In operation S331, the memory controller 120 may read data from the nonvolatile memory device 110. For example, the memory controller 120 may translate a logical address(es) into a physical address(es) by using the map table MT. The memory controller 120 may read data from the nonvolatile memory device 110 by transmitting the read command based on the physical address(es) to the nonvolatile memory device 110.

In operation S333, the memory controller 120 may output the data. For example, the memory controller 120 may output the data read from the nonvolatile memory device 110 to the processing unit 12. In operation S335, the memory controller 120 may output a response. For example, the memory controller 120 may output, to the processing unit 12, a response indicating that the read operation is normally performed.

When the read request is not associated with valid data, in operation S340, the memory controller 120 may determine that the read request is associated with invalid data. For example, when the logical address of the read request corresponds to a logical address of partially invalidated data of the target zone, the read request may be determined as being associated with invalid data. When the logical address of the read request does not correspond to the logical address of the partially invalidated data of the target zone, the read request may be determined as being not associated with invalid data.

When the read request is associated with invalid data, in operation S351 and operation S353, the memory controller 120 may output invalid data. In operation S351, the memory controller 120 may output the invalid pattern data. The invalid pattern data may be pattern data, which are irrelevant to the original data, such as specific pattern data, arbitrary pattern data, dummy pattern data, or random pattern data.

In operation S353, the memory controller 120 may output a response indicating the invalid pattern data to the processing unit 12. For example, the response may include information indicating that the data output to the processing unit 12 are the invalid pattern data. Because the sequential aspect of logical addresses and physical addresses of each zone is maintained and a map table of each zone is maintained until each zone is reset, the memory controller 120 may identify the read request for invalid data as a normal operation. The memory controller 120 may not determine the read request for invalid data as an error.

When the read request is not associated with invalid data, the read request may be a read request for data not written in a zone, for example, a read request being out of the write pointer WP. When the read request is not associated with invalid data, in operation S361 and operation S363, the memory controller 120 may perform error processing. In operation S361, the memory controller 120 may determine an error. For example, as described with reference to FIGS. 8, 9, and 10, the memory controller 120 may generate the map table MT for pages before the write pointer WP. The memory controller 120 may not include the map table MT for a page that exceeds the write pointer WP or is out of the write pointer WP. When a read request for a logical address(es) absent from a map table is received, the memory controller 120 may determine the read request as an error. In operation S363, the memory controller 120 may output a response indicating the error to the processing unit 12.

As described above, the read request for valid data among the data written in the zone and the read request for partially invalidated data among the data written in the zone may be performed as a normal operation. Depending on the read request for valid data, the memory controller 120 may read and output the valid data. Depending on the read request for invalid data, the memory controller 120 may output the preset invalid pattern data without performing the read operation.

Figure 12:
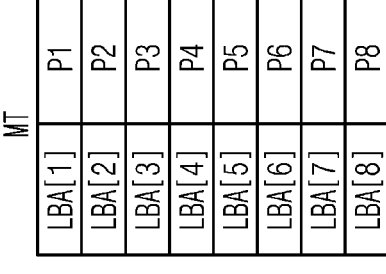
FIG. 12 illustrates an example in which a portion of data of each page is invalidated.
Figure 12:
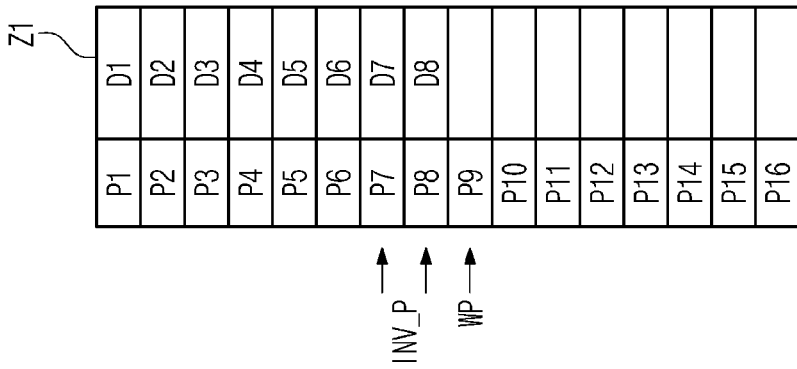

FIG. 12 illustrates an example in which a portion of data of each page is invalidated. In an embodiment, an example in which the partial invalidation INV_P is performed with respect to data written in the first zone Z1 of FIG. 8 is illustrated in FIG. 12. Referring to FIGS. 1, 2, and 12, depending on the partial invalidation request of the processing unit 12, the memory controller 120 may invalidate data corresponding to two first and second logical addresses from among the seventh page data D7 of the 7th page P7 of the first zone Z1 through the partial invalidation INV_P. Also, depending on the partial invalidation request of the processing unit 12, the memory controller 120 may invalidate data corresponding to two third and fourth logical addresses from among the eighth page data D8 of the 8th page P8 of the first zone Z1 through the partial invalidation INV_P.

Because all the data of any one page are not invalidated, the memory controller 120 may maintain the valid page count VPC of the first zone Z1 at "8".

The memory controller 120 may set two first and second bits among the bits of the bitmap BM corresponding to the 7th page P7 to invalid values. The memory controller 120 may set two third and fourth bits among the bits of the bitmap BM corresponding to the 8th page P8 to invalid values.

The memory controller 120 may maintain the map table MT. The original data corresponding to the data partially invalidated by the memory controller 120 may be maintained in the nonvolatile memory device 110.

Figure 13:
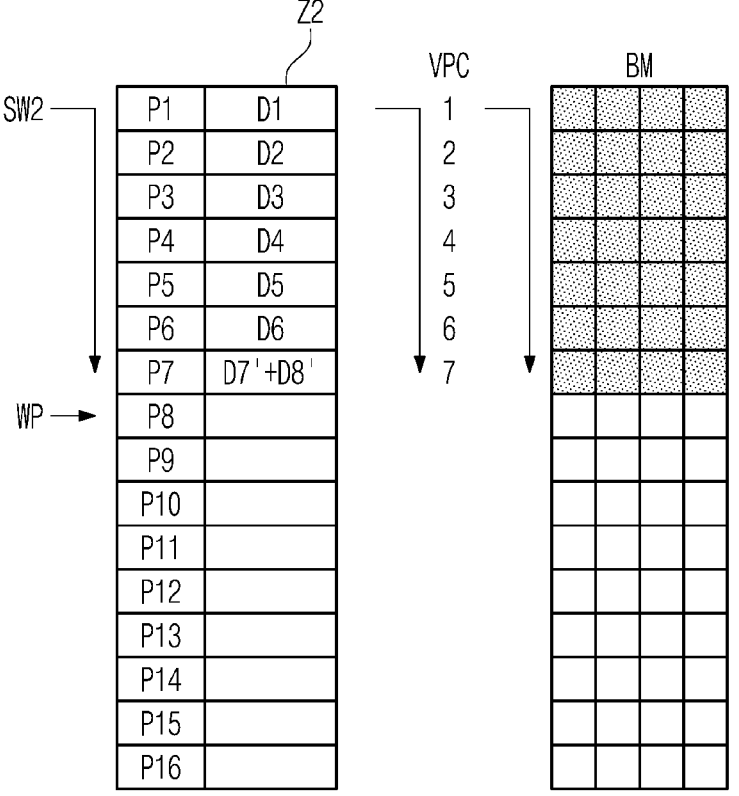
FIG. 13 is a diagram illustrating an example in which valid data of a first zone are copied to a second zone by garbage collection.

FIG. 13 is a diagram illustrating an example in which valid data of the first zone Z1 are copied to the second zone Z2 by garbage collection. Referring to FIGS. 1, 2, and 13, through the second sequential write SW2, the memory controller 120 may sequentially write valid page data among the first to eighth page data D1 to D8 of the first zone Z1, that is, the first to sixth page data D1 to D6, partial data D7' (e.g., the first half) of the seventh page data D7, and partial data D8' (e.g., the second half) of the eighth page data D8 at the 1st to 7th pages P1 to P7 of the second zone Z2.

For example, the memory controller 120 may write the first to sixth page data D1 to D6 at the 1st to 6th pages P1 to P6 of the second zone Z2. The memory controller 120 may integrate the partial data D7' of the seventh page data D7 and the partial data D8' of the eighth page data D8 and may write the integrated data at the 7th page P7 of the second zone Z2.

As the second sequential write SW2 is performed, the memory controller 120 may increase the valid page count VPC of the second zone Z2 from "1" to "7".

As the second sequential write SW2 is performed, the memory controller 120 may set bits of the bitmap BM of the second zone Z2 corresponding to the 1st to 7th pages P1 to P7 to valid values.

As the second sequential write SW2 is performed, the memory controller 120 may generate the map table MT of data written at the 1st to 7th page P1 to P7.

As described with reference to FIGS. 12 and 13, partial invalidation of data written in a zone may be performed for each of logical addresses corresponding to a page and for each page.

Figure 14:
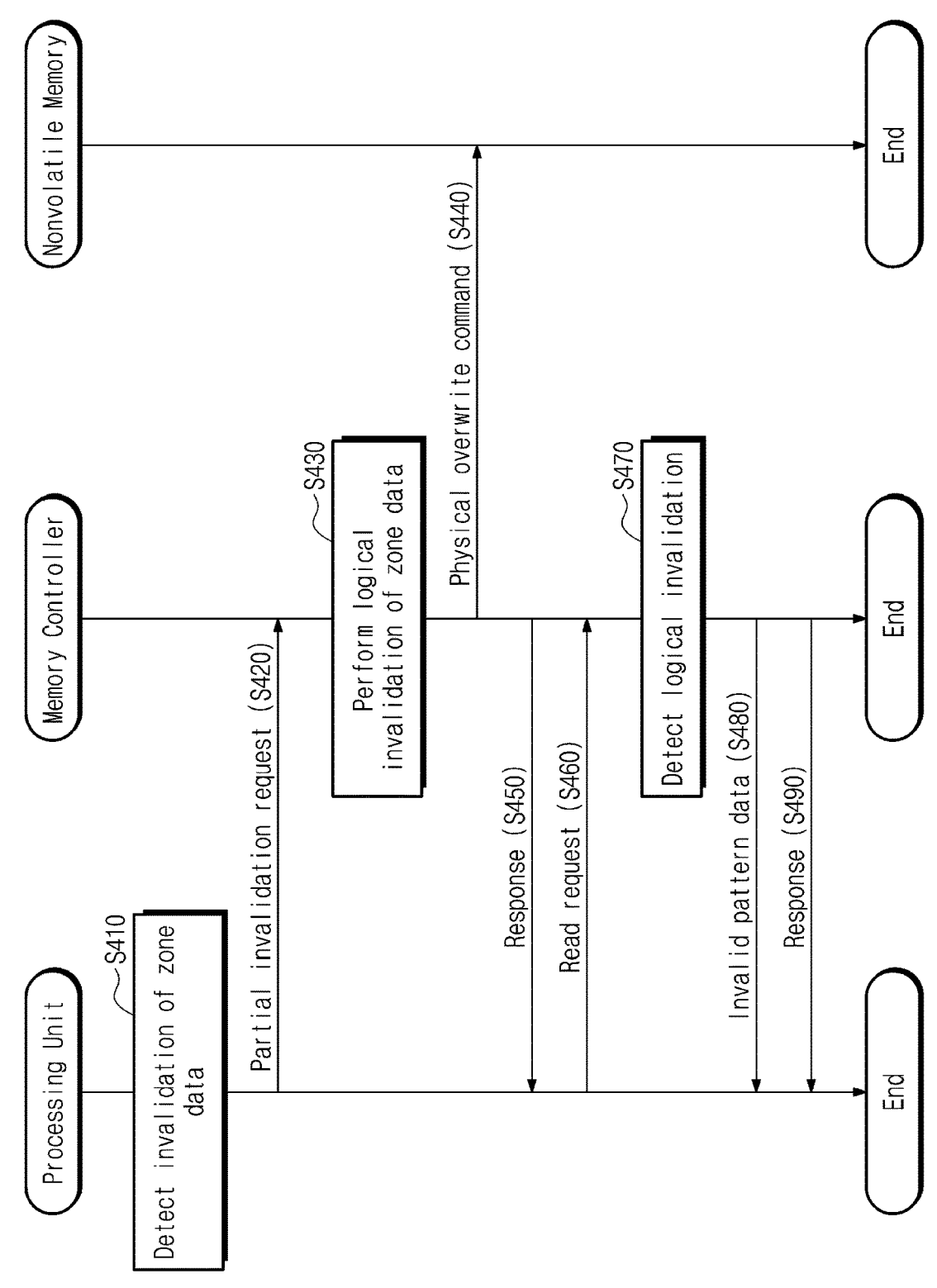
FIG. 14 illustrates another example in which an electronic device performs partial invalidation.

FIG. 14 illustrates another example in which the electronic device 10 performs partial invalidation. In FIG. 14, the descriptions will be given as a specific operation corresponds to a specific operation of FIG. 7. Unless otherwise mentioned clearly in the specification, the descriptions given with reference to the specific operation of FIG. 7 may be identically applied to the corresponding operation of FIG. 14.

Referring to FIGS. 1, 2, and 14, in operation S410, the processing unit 12 may detect invalidation of zone data. Operation S410 may correspond to operation S210 of FIG. 7.

As the invalidation of the zone data is detected, in operation S420, the processing unit 12 may transmit the partial invalidation request to the memory controller 120. Operation S420 may correspond to operation S220 of FIG. 7.

As the partial invalidation request is received, in operation S430, the memory controller 120 may perform logical invalidation of zone data. Operation S430 may correspond to operation S230 of FIG. 7.

After performing the logical invalidation of the zone data, in operation S440, the memory controller 120 may transmit a physical overwrite command to the nonvolatile memory device 110. For example, the memory controller 120 may translate a logical address(es) of the partial invalidation request into a physical address(es) with reference to the map table MT. The memory controller 120 may request the nonvolatile memory device 110 to perform the overwrite operation based on the physical address(es). As the nonvolatile memory device 110 performs the overwrite operation in response to the physical overwrite command, the partial invalidation-requested data may be physically removed (or destroyed) so as not to be read.

In operation S450, the memory controller 120 may transmit a response to the processing unit 12. Operation S450 may correspond to operation S240 of FIG. 7.

In operation S460, the processing unit 12 may transmit the read request to the memory controller 120. Operation S460 may correspond to operation S250 of FIG. 7.

Depending on the read request, in operation S470, the memory controller 120 may detect logical invalidation. Operation S470 may correspond to operation S260 of FIG. 7.

When the logical invalidation is detected, in operation S480, the memory controller 120 may transmit the invalid pattern data to the processing unit 12. Operation S480 may correspond to operation S270 of FIG. 7.

After transmitting the invalid pattern data, in operation S490, the memory controller 120 may transmit a response to the processing unit 12. Operation S490 may correspond to operation S280 of FIG. 7.

Compared to the embodiment described with reference to FIG. 7, when data written in a zone are partially invalidated, the electronic device 10 or the storage device 11 or 100 may perform the overwrite operation with respect to the data written in the nonvolatile memory device 110. That is, the original data may be physically removed at a point in time when partial invalidation is performed. This may mean that the security of data is further improved.

In an embodiment, the partial invalidation request (or command) causing the overwrite operation may be defined to be different from the partial invalidation request (or command) not causing the overwrite operation. Alternatively, the partial invalidation request (or command) causing the overwrite operation may be defined to be identical to the partial invalidation request (or command) not causing the overwrite operation and may be defined to use a descriptor different from that of the partial invalidation request (or command) not causing the overwrite operation.

Figure 15:
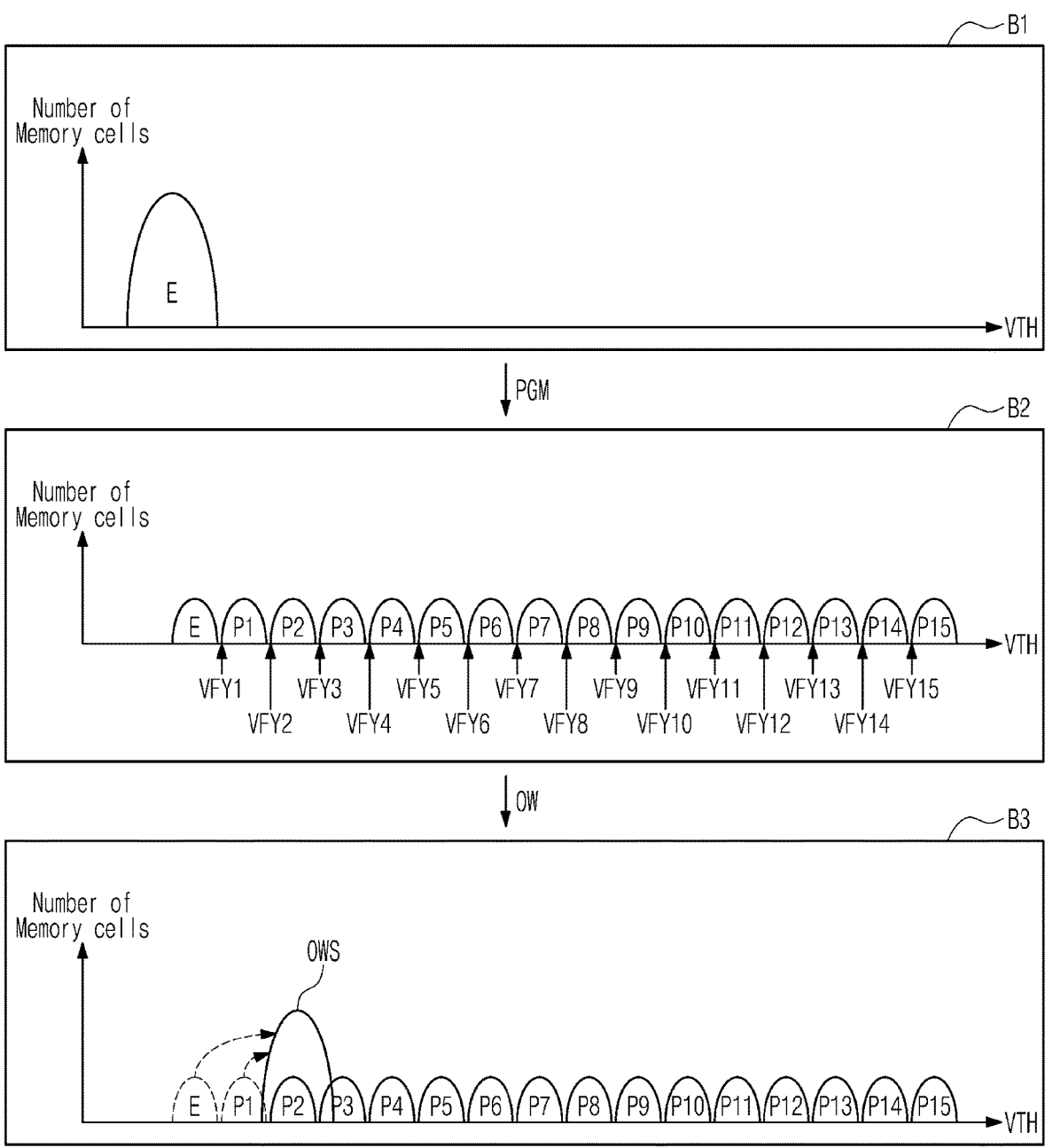
FIG. 15 illustrates examples in which a program operation and an overwrite operation are performed with respect to memory cells.

FIG. 15 illustrates examples in which a program operation PGM and an overwrite operation OW are performed with respect to memory cells. In each box of FIG. 15, a horizontal axis represents a threshold voltage VTH of a memory cell, and a vertical axis represents the number of memory cells. That is, each box of FIG. 15 shows a distribution of threshold voltages of memory cells of one page.

Referring to FIGS. 2, 3, and 15, in an embodiment, memory cells of one page may be connected to the same word line. Memory cells of one page may receive a common voltage through a common word line.

In a state where data are not written at a page, for example, as shown by a first box B1, the memory cells may have threshold voltages corresponding to an erase state ES. A threshold voltage distribution of the memory cells may correspond to the erase state ES.

After the program operation PGM is performed, as shown by the second box B2, each of the memory cells may be programmed to a target state among the erase state ES and the 1st to 15th program states PS1 to PS15. For example, the nonvolatile memory device 200 may maintain the threshold voltages of the memory cells having the erase state ES as the target state.

The nonvolatile memory device 200 may increase the threshold voltages of the memory cells having the 1st to 15th program states PS1 to PS15 as the target states by using the 1st to 15th verify voltages VFY1 to VFY15. For example, the nonvolatile memory device 200 may increase the threshold voltages of the memory cells having the m-th program state PSm (m being a positive integer equal to or smaller than "(2^y)−1") as the target state until the threshold voltages of the memory cells are greater than the m-th verify voltage VFYm. The memory controller 120 may identify the data written in the nonvolatile memory device 200 by performing the read operation by using the read voltages whose levels are between different states.

When the overwrite operation OW is performed, as shown by the third box B3, the nonvolatile memory device 200 may increase threshold voltages of memory cells of at least two states being the lowest, for example, the erase state ES and the 1st program state PS1 so as to belong to threshold voltage distributions of any other states. As the overwrite operation OW is performed, memory cells belonging to two different states may be updated to have the same state OWS (e.g., overlapping the program state P2 and partially overlapping the program state P3 as show in the third box B3). That is, the memory controller 120 may physically remove the original data by causing a read error through the overwrite operation OW.

Figure 16:
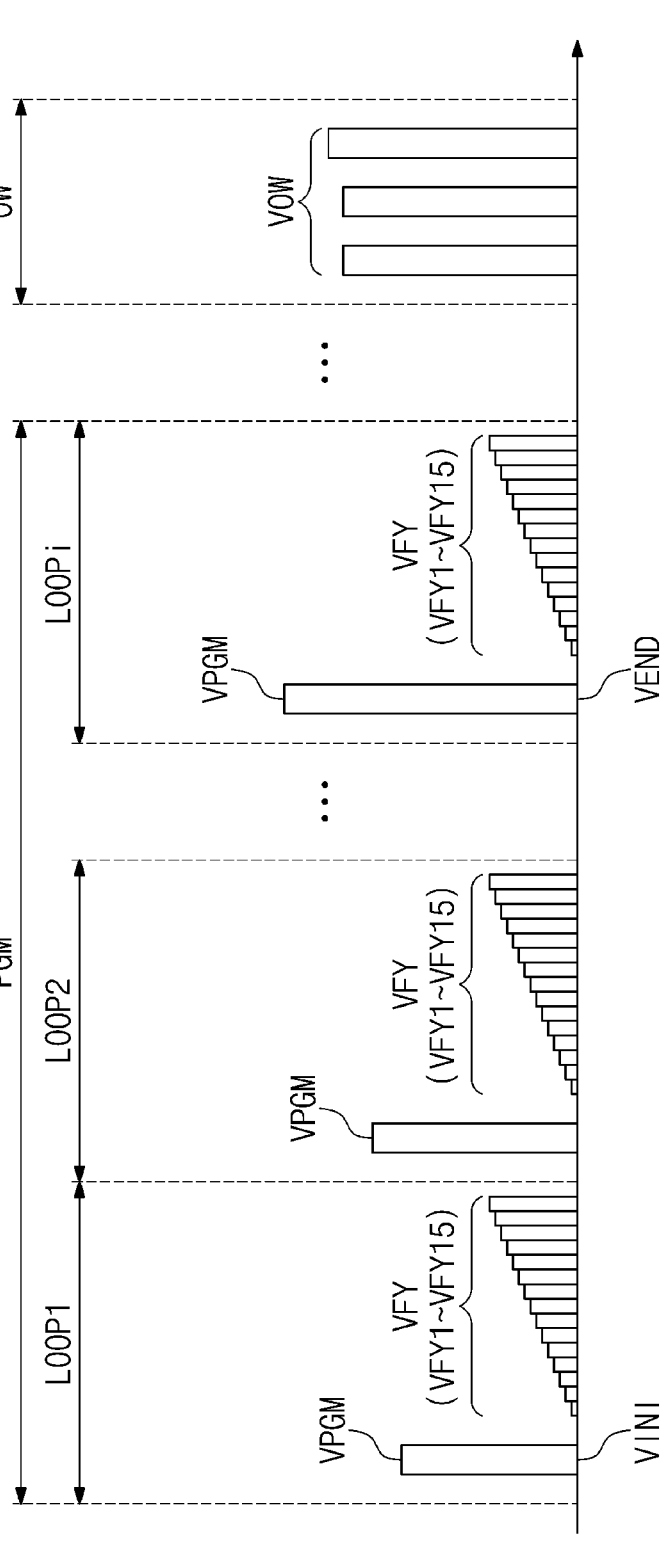
FIG. 16 illustrates an example in which a nonvolatile memory device performs a program operation and an overwrite operation.

FIG. 16 illustrates examples in which the nonvolatile memory device 200 performs the program operation PGM and the overwrite operation OW. Referring to FIGS. 2 and 16, the program operation PGM may include first to i-th program loops LOOP1 to LOOPi (i being a positive integer).

In each program loop, the nonvolatile memory device 200 may apply a program voltage VPGM to memory cells of a page through a word line. The program voltage VPGM may increase the threshold voltages of the memory cells of the page. The nonvolatile memory device 200 may apply verify voltage VFY including at least some of the 1st to 15th verify voltages VFY1 to VFY15 to the memory cells of the page through the word line. The nonvolatile memory device 200 may determine whether each of the memory cells of the page is programmed to the target state, through the verify voltages VFY.

The program loop may be repeated until the memory cells of the page are completely programmed. As the program loop is repeated, the program voltage VPGM may increase. The program voltage VPGM of the first program loop LOOP1 (e.g., a start program loop) may be a program start voltage VINI. The program voltage VPGM of the i-th program loop LOOPi (e.g., a last program loop) may be a program end voltage VEND.

In an embodiment, in initial program loops among the first to i-th program loops LOOP1 to LOOPi, the nonvolatile memory device 200 may not use verify voltages having relatively high levels from among the verify voltages VFY to verify the memory cells of the page. In the remaining program loops other than the initial program loops, the nonvolatile memory device 200 may not use verify voltages having relatively low levels from among the verify voltages VFY to verify the memory cells of the page.

In the overwrite operation OW, the nonvolatile memory device 200 may apply an overwrite voltage VOW to the memory cells of the page through the word line. The overwrite voltage VOW may have a level between the program start voltage VINI and the program end voltage VEND. The nonvolatile memory device 200 may apply the overwrite voltage VOW to memory cells of the page at least twice through the word line without verification. The nonvolatile memory device 200 may maintain, increase, or decrease the level of the overwrite voltage VOW that is applied to the memory cells of the page.

As the level of the overwrite voltage VOW decreases, the degree to which threshold voltages of the memory cells of the page increase may decrease. Accordingly, the number of states of memory cells whose threshold voltages increase may decrease in the overwrite operation OW. As the level of the overwrite voltage VOW increases, the degree to which threshold voltages of the memory cells of the page increase may increase. Accordingly, the number of states of memory cells whose threshold voltages increase may increase in the overwrite operation OW.

As described above, based on the partial invalidation request, the storage device 11 or 100 according to an embodiment of the present disclosure may manage a portion of data written in a zone as being logically invalidated or may physically remove (or destroy) the logically invalidated data. Accordingly, the storage device 11 or 100 whose security is improved is provided.

Figure 17:
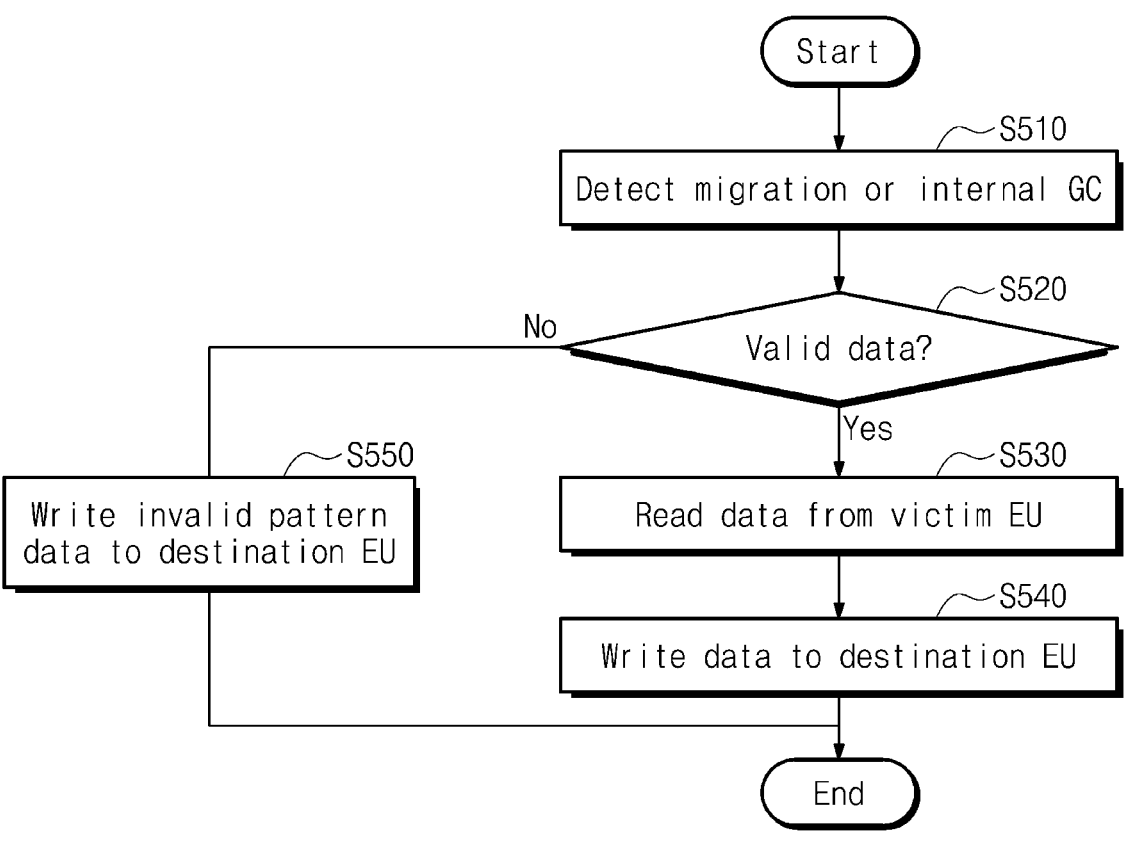
FIG. 17 is a diagram illustrating an example in which a storage device manages invalid data.

FIG. 17 is a diagram illustrating an example in which the storage device 11 or 100 manages invalid data. In an embodiment, before writing data to be written in a zone in the erase unit of the first storage region 110*a* allocated to the zone, the storage device 11 or 100 may buffer the data by using the erase units of the fourth storage region 110*d*. That is, before the data written in the zone are written in the erase unit of the first storage region 110*a*, a portion of the data written in the zone may be partially invalidated in the process of being buffered in the erase units of the fourth storage region 110*d*. FIG. 17 shows an example in which the data storage device 11 or 100 manages data partially invalidated during buffering.

Referring to FIGS. 2, 4, and 17, in operation S510, the memory controller 120 may detect migration or internal garbage collection GC. The migration may refer to an operation of moving the data written in the erase units of the fourth storage region 110*d* to the erase unit of the first storage region 110*a* allocated to the zone. The internal garbage collection GC may refer to garbage collection that the memory controller 120 internally performs with respect to the data being buffered in the erase units of the fourth storage region 110*d* between the erase units of the fourth storage region 110d for the purpose of securing the free erase unit of the fourth storage region 110d.

In operation S520, the memory controller 120 may determine whether original data of the migration or internal garbage collection GC are valid data. When the original data are valid data, in operation S530, the memory controller 120 may read data from a victim erase unit EU. The victim erase unit EU may refer to an erase unit that stores the original data to be moved by the migration or internal garbage collection GC. In operation S540, the memory controller 120 may write the read data in a destination erase unit EU. That is, the valid data may be copied from the victim erase unit EU to the destination erase unit EU.

When the original data are not valid data, in operation S550, the memory controller 120 may write the invalid pattern data in the destination erase unit EU. For example, the memory controller 120 may not read the original data from the victim erase unit EU, but it may write the preset invalid pattern data in the destination erase unit EU. As the invalid pattern data are written in the destination erase unit EU, the original data that are partially invalidated may be physically removed in the migration or internal garbage collection (GC) process.

In an embodiment, to guarantee the sequential aspect of logical addresses and physical addresses of data written in a zone, the memory controller 120 may not process the read request for the invalid pattern data written in the destination erase unit EU as an error. When the read request for the invalid pattern data is received, the memory controller 120 may output a response indicating the invalid pattern data, not a response indicating that an error occurs.

Figure 18:
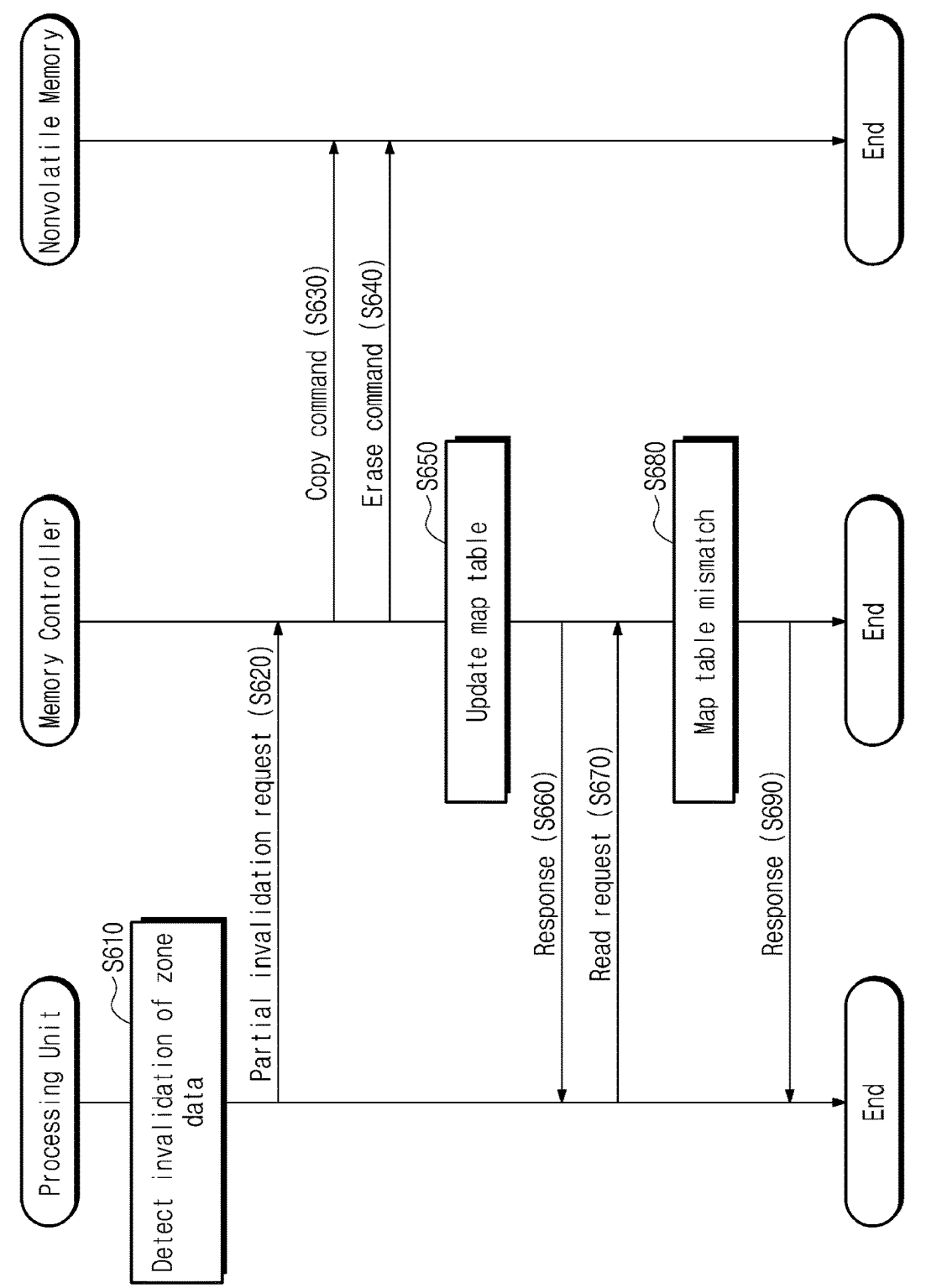
FIG. 18 illustrates another example in which an electronic device performs partial invalidation.

FIG. 18 illustrates another example in which the electronic device 10 performs partial invalidation. In FIG. 18, the descriptions will be given as a specific operation corresponds to a specific operation of FIG. 7. Unless otherwise mentioned clearly in the specification, the descriptions given with reference to the specific operation of FIG. 7 may be identically applied to the corresponding operation of FIG. 18.

Referring to FIGS. 1, 2, and 18, in operation S610, the processing unit 12 may detect invalidation of zone data. Operation S610 may correspond to operation S210 of FIG. 7.

As the invalidation of the zone data is detected, in operation S620, the processing unit 12 may transmit the partial invalidation request to the memory controller 120. Operation S620 may correspond to operation S220 of FIG. 7.

As the partial invalidation request is received, in operation S630, the memory controller 120 may transmit a copy command to the nonvolatile memory device 110. For example, the memory controller 120 may transmit, to the nonvolatile memory device 110, a command that includes source information and destination information and requires performing the copy operation. Alternatively, the memory controller 120 may transmit, to the nonvolatile memory device 110, a read command including source information and a write command including destination information.

Through operation S630, the memory controller 120 may copy the remaining portion other than the partial invalidation target among the data of the memory block (e.g., a source memory block) corresponding to the partial invalidation request to the destination memory block. That is, valid data of the source memory block of the nonvolatile memory device 110 may be copied to the destination memory block.

In operation S640, the memory controller 120 may transmit an erase command to the nonvolatile memory device 110. For example, the memory controller 120 may transmit, to the nonvolatile memory device 110, the erase command for a memory block corresponding to the partial invalidation request, that is, the source block of the copy command in operation S630.

The data corresponding to the partial invalidation request may be physically completely removed from the nonvolatile memory device 110 by copying valid data of the source memory block corresponding to the partial invalidation request to the destination block and erasing the source memory block. Accordingly, the security of the storage device 100 may be improved.

In operation S650, the memory controller 120 may update a map table. For example, the memory controller 120 may delete map data of the source memory block. The memory controller 120 may record logical addresses and physical address of the valid data copied to the destination memory block.

In an embodiment, the logical addresses of the data copied to the destination memory block may not be sequential due to the partially invalidated data. The memory controller 120 may not manage the destination memory block based on a zone or may select a memory block, which is not managed based on a zone, as the destination memory block.

In operation S660, the memory controller 120 may transmit a response to the processing unit 12. Operation S660 may correspond to operation S240 of FIG. 7.

In operation S670, the processing unit 12 may transmit the read request to the memory controller 120. Operation S670 may correspond to operation S250 of FIG. 7.

Depending on the read request, in operation S680, the memory controller 120 may detect map table mismatch. For example, because there is no map table of the read-requested logical address, the memory controller 120 may detect the map table mismatch.

After the map table mismatch is detected, in operation S690, the memory controller 120 may transmit a response to the processing unit 12. Operation S690 may correspond to operation S280 of FIG. 7. The response may include information indicating that the read error occurs.

Compared to the embodiment described with reference to FIGS. 7 and 14, when data written in a zone are partially invalidated, the electronic device 10 or the storage device 11 or 100 may perform the erase operation with respect to the data written in the nonvolatile memory device 110. That is, the original data may be physically removed at a point in time when partial invalidation is performed. This may mean that the security of data is further improved.

In an embodiment, the partial invalidation request (or command) causing the erase operation may be defined to be different from the invalidation request (or command) causing the overwrite operation or the partial invalidation request (or command) not causing the overwrite operation. Alternatively, the partial invalidation request (or command) causing the erase operation may be defined to be identical to the invalidation request (or command) causing the overwrite operation or the partial invalidation request (or command) not causing the overwrite operation and may be defined to use any other descriptor.

Figure 19:
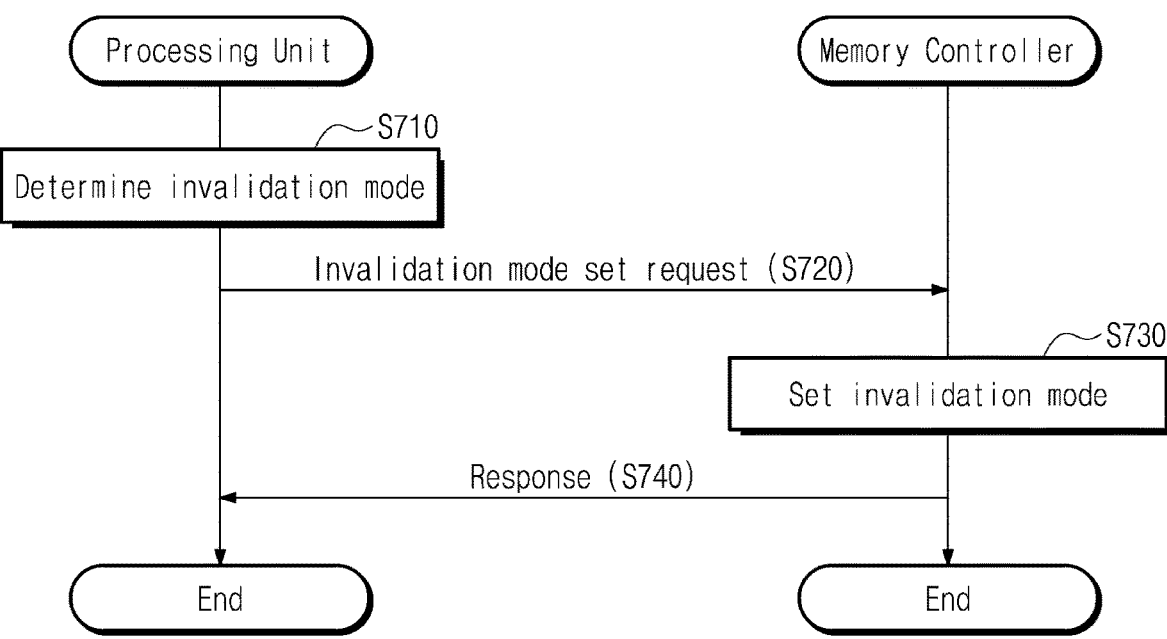
FIG. 19 illustrates an example in which an electronic device sets a partial invalidation mode.

FIG. 19 illustrates an example in which the electronic device 10 sets a partial invalidation mode. Referring to FIGS. 1, 2, and 19, in operation S710, the processing unit 12 may determine an invalidation mode. For example, the invalidation mode may include a first mode being a logical invalidation mode, a second mode being an overwrite mode, and a third mode being an erase mode.

In operation S720, the processing unit 12 may transmit an invalidation mode set request to the memory controller 120. The invalidation mode set request may be transferred to the memory controller 120 through the UPIU, for example, the command UPIU or the query request UPIU or in compliance with any other appropriate format.

Depending on the invalidation mode set request, in operation S730, the memory controller 120 may set the invalidation mode. After the invalidation mode is set, the memory controller 120 may perform the partial invalidation request depending on the set mode.

In operation S740, the memory controller 120 may transmit a response, which indicates that the mode is completely set, to the processing unit 12.

As described above, depending on the preset invalidation mode, the storage device 100 may perform the same partial invalidation request in one of the first mode, the second mode, and the third mode.

In an embodiment, the first mode, the second mode, and the third mode may be defined depending on a security level. The first mode may correspond to the lowest security level. The third mode may correspond to the highest security level. The second mode may correspond to a middle security level. The processing unit 12 may set the partial invalidation mode of the storage device 11 or 100 by setting the security level of the storage device 11 or 100.

As another example, when transmitting the partial invalidation request to the storage device 11 or 100, the processing unit 12 may allow invalidation mode information (or security level information) to be included in the partial invalidation request. The storage device 11 or 100 may perform partial invalidation depending on the invalidation mode information (or the security level information) included in the partial invalidation request.

FIG. 201 is a diagram of a system 1000 to which a storage device is applied, according to an embodiment. The system 1000 of FIG. 201 may basically be a mobile system, such as a portable communication terminal (e.g., a mobile phone), a smartphone, a tablet personal computer (PC), a wearable device, a healthcare device, or an Internet of things (IOT) device. However, the system 1000 of FIG. 201 is not necessarily limited to the mobile system and may be a PC, a laptop computer, a server, a media player, or an automotive device (e.g., a navigation device).

Referring to FIG. 201, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a and 1200b may be used as main memory devices of the system 1000. Although each of the memories 1200a and 1200b may include a volatile memory, such as static random access memory (SRAM) and/or dynamic RAM (DRAM), each of the memories 1200a and 1200b may include non-volatile memory, such as a flash memory, phase-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers(STRG CTRL) 1310a and 1310b and NVM(Non-Volatile Memory)s 1320a and 1320b configured to store data via the control of the storage controllers 1310a and 1310b. Although the NVMs 1320a and 1320b may include flash memories having a two-dimensional (2D) structure or a three-dimensional (3D) V-NAND structure, the NVMs 1320a and 1320b may include other types of NVMs, such as PRAM and/or RRAM.

The storage devices 1300a and 1300b may be physically separated from the main processor 1100 and included in the system 1000 or implemented in the same package as the main processor 1100. In addition, the storage devices 1300a and 1300b may have types of solid-state devices (SSDs) or memory cards and be removably combined with other components of the system 100 through an interface, such as the connecting interface 1480 that will be described below. The storage devices 1300a and 1300b may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

Figure 20:
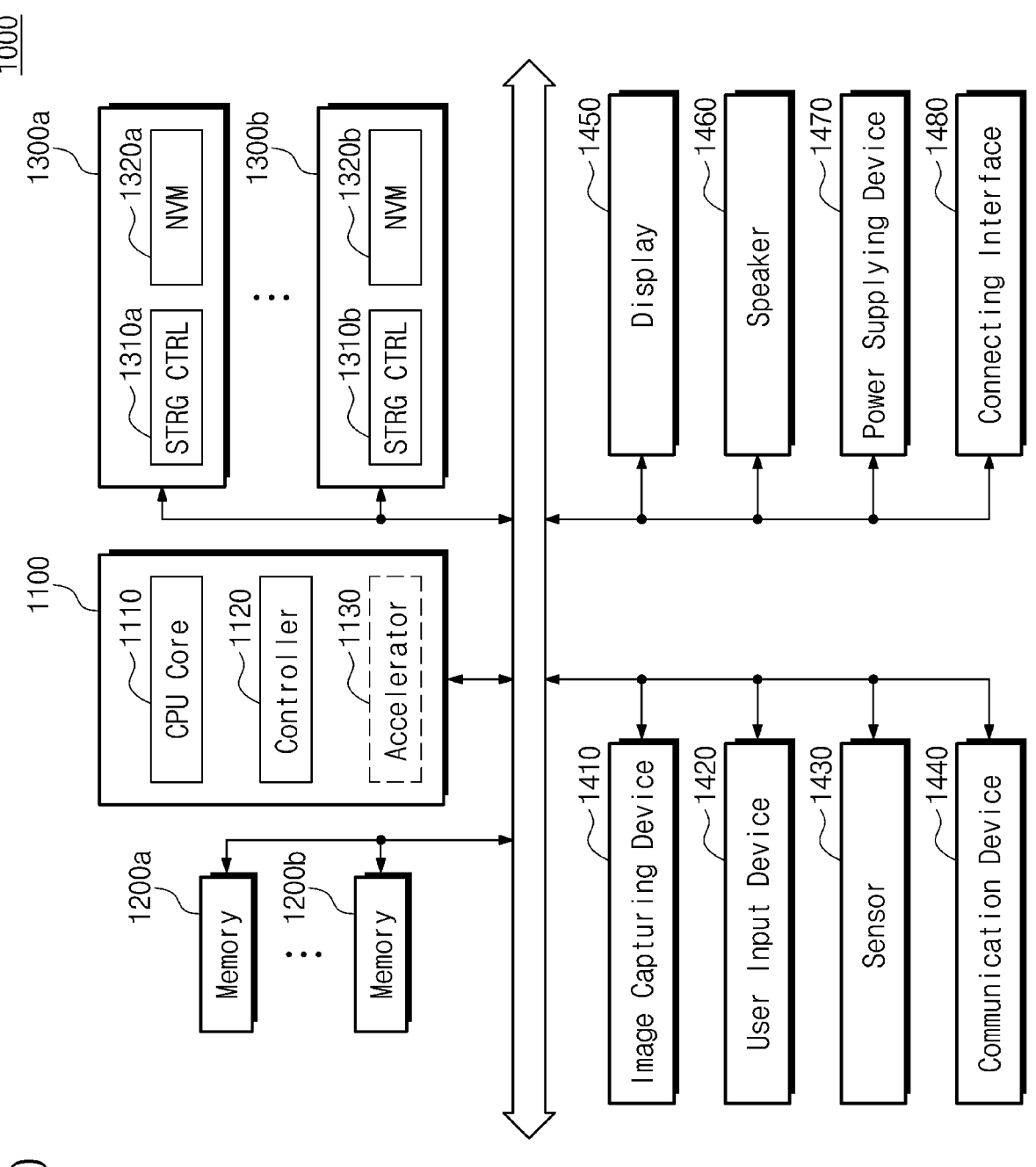
FIG. 20 is a diagram illustrating a system according to an embodiment of the present disclosure.

In an embodiment, the storage device 11 or 100 described with reference to FIGS. 1 to 19 may be implemented with the storage devices 1300*a* and 1300*b*. Also, the processing unit 12 described with reference to FIGS. 1 to 19 may be implemented with the main processor 1100. For example, the main processor 1100 may transmit the partial invalidation request to the storage devices 1300*a* and 1300*b*. In response to the partial invalidation request, the storage devices 1300*a* and 1300*b* may logically manage a portion of data written in a zone as invalid data or may remove the portion of the data while logically managing the portion of the data as invalid data. The description given with reference to the storage device 11 or 100 and the processing unit 12 in FIGS. 1 to 19 may be equally applied to the storage devices 1300*a* and 1300*b* and the main processor 1100 of FIG. 20.

In the above embodiments, components according to the present disclosure are described by using the terms "first", "second", "third", etc. However, the terms "first", "second", "third", etc. may be used to distinguish components from each other and do not limit the present disclosure. For example, the terms "first", "second", "third", etc. do not involve an order or a numerical meaning of any form.

In the above embodiments, components according to embodiments of the present disclosure are referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

According to embodiments of the present disclosure, a storage device may reduce a write amplification factor WAF by permitting only a sequential write with respect to a zone. Also, the storage device may support fast invalidation of important data by permitting partial invalidation of data written in a zone. Accordingly, a storage device capable of reducing the write amplification factor WAF and providing improved security to important data and an operating method of the storage device are provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A storage device comprising:
   a nonvolatile memory device comprising a plurality of erase units each comprising a plurality of memory cells; and a memory controller,
   wherein, based on an open zone request received from an external host device, the memory controller is configured to allocate a zone to at least one erase unit among the plurality of erase units and to permit only a sequential write with respect to the zone,
   wherein the memory controller is further configured to generate a map table, and the map table maps sequential logical addresses of first data written in the zone to sequential physical addresses,
   wherein, based on a partial invalidation request received from the external host device, the memory controller is further configured to manage second data, from among the first data that corresponds to the partial invalidation request, as invalid data while maintaining the map table with the sequential logical addresses and the sequential physical addresses of the first data written in the zone without updating the map table until a garbage collection operation, and
   wherein, during the garbage collection operation, the memory controller is further configured to sequentially copy the first data, except for the second data corresponding to the partial invalidation request, to a second zone, and generate a second map table mapping sequential logical addresses of the copied first data in the second zone.

2. The storage device of claim 1, wherein the memory controller is further configured to:
   increase a valid page count of the zone based on first page data being written to the zone; and
   decrease the valid page count of the zone based on the first page data being invalidated.

3. The storage device of claim 2, wherein, based on the valid page count being different from a page number pointed out by a write pointer, the memory controller is further configured to determine that at least one of pages of the zone, at which the first data are written, stores invalid page data.

4. The storage device of claim 1, wherein each page of the zone corresponds to two or more logical addresses, and
   wherein the memory controller is further configured to:
      set a relevant bit of a bitmap of the zone to a valid value based on third data being written at to the zone, wherein the third data corresponds to a first logical address; and
      set the relevant bit of the bitmap of the zone to an invalid value based on the third data being invalidated.

5. The storage device of claim 1, wherein the partial invalidation request comprises two or more logical addresses.

6. The storage device of claim 1, wherein the partial invalidation request comprises two or more logical address ranges, and
   wherein each of the two or more logical address ranges comprises a start logical address and a length.

7. The storage device of claim 1, wherein the memory controller is further configured to transmit invalid pattern data to the external host device, based on a read request for the invalid data received from the external host device.

8. The storage device of claim 7, wherein the memory controller is further configured to transmit the invalid pattern data to the external host device without a read operation of the nonvolatile memory device.

9. The storage device of claim 7, wherein the memory controller is further configured to transmit a response indicating the invalid pattern data after transmitting the invalid pattern data to the external host device.

10. The storage device of claim 1, wherein, while the memory controller is further configured to manage the second data corresponding to the partial invalidation request as the invalid data, the nonvolatile memory device is configured to retain original valid data corresponding to the partial invalidation request.

11. The storage device of claim 10, wherein the memory controller is further configured to delete the map table in response to that a reset request of the zone is received from the external host device.

12. The storage device of claim 11, wherein an access to the invalid data is prohibited based on that the map table is deleted.

13. A storage device comprising:

a nonvolatile memory device comprising a plurality of erase units each comprising a plurality of memory cells; and a memory controller, wherein, based on an open zone request received from an external host device, the memory controller is configured to allocate a zone to at least one erase unit among the plurality of erase units and to permit only a sequential write with respect to the zone, wherein the memory controller is further configured to generate a map table, and the map table maps sequential logical addresses of first data written in the zone to sequential physical addresses, wherein, based on a partial invalidation request received from the external host device, the memory controller is further configured to perform an overwrite operation with respect to second data, from among the first data that corresponds to the partial invalidation request, while maintaining the map table with the sequential logical addresses and the sequential physical addresses of the first data written in the zone without updating the map table until a garbage collection operation, and wherein, during the garbage collection operation, the memory controller is further configured to sequentially copy the first data, except for the second data corresponding to the partial invalidation request, to a second zone, and generate a second map table mapping sequential logical addresses of the copied first data in the second zone.

14. The storage device of claim 13, wherein, when data are written to the zone, the nonvolatile memory device is further configured to program memory cells of each page of the zone to a state among an erase state and a plurality of program states, and wherein, in the overwrite operation, the nonvolatile memory device is further configured to increase threshold voltages of the memory cells having the erase state and at least one program state of the plurality of program states so as to overlap some of remaining program states other than the at least one program state of the plurality of program states.

15. The storage device of claim 13, wherein, based on the first data being written to the zone, the nonvolatile memory device is further configured to apply program voltages, whose levels belong to a range from a program start voltage to a program end voltage, to memory cells of a page, and wherein, in the overwrite operation, the nonvolatile memory device is further configured to apply at least one overwrite voltage to second memory cells of the page, wherein the second memory cells correspond to the partial invalidation request.

16. The storage device of claim 15, wherein the at least one overwrite voltage has a level between the program start voltage and the program end voltage.

17. The storage device of claim 16, wherein the at least one overwrite voltage comprises at least two overwrite voltages with different levels.

18. The storage device of claim 13, wherein, based on the partial invalidation request received from the external host device, the memory controller is further configured to manage the second data corresponding to the partial invalidation request from among the first data written in the zone as invalid while maintaining the map table.

19. The storage device of claim 18, wherein the memory controller is further configured to transmit invalid pattern data to the external host device, based on a read request for the second data received from the external host device.

20. An operating method of a storage device comprising a nonvolatile memory device and a memory controller, the operating method comprising:

generating a map table that maps sequential logical addresses of first data written in a zone to sequential physical addresses;

setting a partial invalidation request to one of a first mode, a second mode, and a third mode depending on a request of an external host device;

in the first mode, managing, at the memory controller, second data corresponding to the partial invalidation request as being invalid based on the partial invalidation request received from the external host device;

in the second mode, based on the partial invalidation request received from the external host device, causing, by the memory controller, the nonvolatile memory device to perform an overwrite operation with respect to the second data, from among the first data that corresponds to the partial invalidation request, and managing the second data as being invalid;

in the third mode, based on the partial invalidation request received from the external host device:

sequentially copying, by the memory controller to a second memory block during a garbage collection operation, the first data except for the second data corresponding to the partial invalidation request and generating a second map table mapping sequential logical addresses of the copied first data in the second memory block, the second data being among third data of a memory block corresponding to the partial invalidation request, and erasing the memory block corresponding to the partial invalidation request; and maintaining the map table with the sequential logical addresses and the sequential physical addresses of the first data written in the zone without updating the map table until the garbage collection operation.

* * * * *